United States Patent
Ohno et al.

(10) Patent No.: US 9,885,910 B2
(45) Date of Patent: Feb. 6, 2018

(54) TWISTED ALIGNMENT MODE LIQUID CRYSTAL DISPLAY DEVICE

(71) Applicant: FUJIFILM Corporation, Tokyo (JP)

(72) Inventors: Takahiro Ohno, Kanagawa (JP); Rikio Inoue, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 610 days.

(21) Appl. No.: 14/600,786

(22) Filed: Jan. 20, 2015

(65) Prior Publication Data
US 2015/0168780 A1   Jun. 18, 2015

Related U.S. Application Data

(63) Continuation of application No. PCT/JP2013/069348, filed on Jul. 17, 2013.

(30) Foreign Application Priority Data

Jul. 25, 2012   (JP) ................... 2012-164531

(51) Int. Cl.
*G02F 1/1335* (2006.01)
*G02F 1/13363* (2006.01)
*G02F 1/1343* (2006.01)

(52) U.S. Cl.
CPC .... *G02F 1/133602* (2013.01); *G02F 1/13363* (2013.01); *G02F 1/13439* (2013.01);
(Continued)

(58) Field of Classification Search
CPC ......... G02F 1/133602; G02F 1/133634; G02F 1/133528; G02F 1/13363; G02F 1/13439;
(Continued)

(56) References Cited

U.S. PATENT DOCUMENTS 5,699,136 A   12/1997   Arakawa et al.
8,350,996 B2   1/2013   Hisakado et al.
(Continued)

FOREIGN PATENT DOCUMENTS

JP   H04-162018 A   6/1992
JP   H06-214116 A   8/1994
(Continued)

OTHER PUBLICATIONS

International Preliminary Report Chapter II issued in PCT/JP2013/069348 dated Apr. 1, 2014.
(Continued)

*Primary Examiner* — Nathanael R Briggs
*Assistant Examiner* — William Peterson
(74) *Attorney, Agent, or Firm* — Edwards Neils LLC; Jean C. Edwards, Esq.

(57) ABSTRACT

Provided is a liquid crystal display device in which the contrast is improved. The liquid crystal display device includes a first polarizing film, a second polarizing film, a twisted alignment mode liquid crystal and a backlight unit with a light-collecting prism sheet which is disposed on the back side of the liquid crystal cell, the first retardation film and the second retardation film each satisfy Formulae (I) and (II):

$$1 \text{ nm} \leq Re(550) \leq 50 \text{ nm} \quad (I)$$

$$120 \text{ nm} \leq Rth(550) \leq 220 \text{ nm} \quad (II);$$

the liquid crystal cell has a depolarizing index (DI value) of 0.000800 or less.

19 Claims, 5 Drawing Sheets

(52) U.S. Cl.
CPC .. *G02F 1/133528* (2013.01); *G02F 1/133606* (2013.01); *G02F 1/133634* (2013.01); *G02F 2001/133607* (2013.01); *G02F 2202/40* (2013.01); *G02F 2413/02* (2013.01); *G02F 2413/15* (2013.01)

(58) Field of Classification Search
CPC ... G02F 1/133606; G02F 2001/133607; G02F 2202/40; G02F 2413/02; G02F 2413/15
USPC .......................................................... 349/119
See application file for complete search history.

(56) References Cited

U.S. PATENT DOCUMENTS

| | | | |
|---|---|---|---|
| 2009/0009866 | A1 | 1/2009 | Hisakado et al. |
| 2010/0231830 | A1* | 9/2010 | Hirakata ................ G02B 1/105 349/85 |

FOREIGN PATENT DOCUMENTS

| | | |
|---|---|---|
| JP | H10-186356 A | 7/1998 |
| JP | 2007-256589 A | 10/2007 |
| JP | 2009-037231 A | 2/2009 |
| JP | 2013-041240 A | 2/2013 |

OTHER PUBLICATIONS

International Preliminary Report on Patentability dated Jan. 29, 2015 in connection with the corresponding International Application No. PCT/JP2013/069348.

* cited by examiner

The luminous intensity is normalized with the value (cd) measured at the front (0°).

······· collecting no light
—×— A
—○— B
—△— C

TWISTED ALIGNMENT MODE LIQUID CRYSTAL DISPLAY DEVICE

CROSS-REFERENCE TO RELATED APPLICATIONS

This application is a Continuation of PCT International Application PCT/JP2013/069348 filed on Jul. 17, 2013, which was published under PCT article 21(2) in Japanese, which claims priority under 35 U.S.C §119(a) to Japanese Patent Application No. 2012-164531 filed on Jul. 25, 2012. The above applications are hereby expressly incorporated by reference, in their entirety, into the present application.

FIELD OF THE INVENTION

The present invention relates to a twisted alignment mode (hereinafter, also referred to as TN mode) liquid crystal display device, specifically, a TN mode liquid crystal display device that can display high-contrast images having excellent visibility for character representation.

DESCRIPTION OF THE RELATED ART

Liquid crystal display devices including liquid crystal cells and polarizing plates are used in OA equipment, such as word processors, notebook computers, and personal computers, portable terminals, and television sets. A polarizing plate is generally composed of a polarizing film and protective films adhering to the two surfaces of the polarizing film. For example, the polarizing film is produced by dyeing a poly(vinyl alcohol) film with iodine and stretching it, and the polarizing plate is prepared by laminating protective films, such as cellulose triacetate films, on the opposite surfaces of the polarizing film. A liquid crystal cell generally includes a liquid crystal material, two substrates for sealing the liquid crystal material, and electrode layers for applying a voltage to the liquid crystal molecules. The liquid crystal cell undergoes ON and OFF display operations depending on a difference in the alignment state of the liquid crystal molecules and can be applied to all of the transmissive, reflective, and semi-transmissive displays. In a transmissive liquid crystal display device, polarizing plates are disposed on both sides of a liquid crystal cell, whereas in a reflective liquid crystal display device, a reflection plate, a liquid crystal cell, and a polarizing plate are disposed in this order.

In a proposed configuration, one or more optical compensation sheets are disposed between a polarizing plate and a liquid crystal cell. The optical compensation sheet prevents images from coloring and enlarges the viewing angle, for example. Traditional optical compensation sheets are stretched polymer films having birefringence. In another proposed configuration, an optical compensation sheet comprising an optical anisotropic layer composed of a low molecular weight or high molecular weight liquid crystal compound is disposed on a transparent support, instead of the stretched film having birefringence. In addition, these optical compensation sheets are used as protective films of polarizing plates.

Various modes, such as twisted nematic (TN), in-plane switching (IPS), optically compensatory bend (OCB), vertically aligned (VA), electrically controlled birefringence (ECB), and super twisted nematic (STN) modes, have been proposed for liquid crystal display devices. The optical properties of an optical compensation sheet are determined depending on the optical characteristics of the liquid crystal cell, specifically, depending on the display mode such as mentioned above.

A typical example of the optical compensation of a TN mode involves disposing a pair of stretched films having the same retardation between a polarizing plate and a liquid crystal cell, the stretched films being laminated such that the optical axes are orthogonal to each other and the in-plane retardation is approximated to 0 nm (e.g., see Patent Literature 1). Another example of the optical compensation of a TN mode is to utilize the alignment of a liquid crystal composition (e.g., Patent Literatures 2 and 3).

The optical compensation sheets of stretched films, which are inexpensive and have high light transmittance, can be provided as practically usable products depending on the application of the liquid crystal display devices (e.g., Patent Literature 4), although the sheets have slightly inferior viewing angle characteristics compared to the optical compensation sheets of liquid crystal compounds at this moment.

RELATED ART

Patent Document

[Patent Literature 1] Japanese Patent Laid-Open No. H04-162018
[Patent Literature 2] Japanese Patent Laid-Open No. H06-214116
[Patent Literature 3] Japanese Patent Laid-Open No. H10-186356
[Patent Literature 4] Japanese Patent Laid-Open No. 2009-037231

DISCLOSURE OF THE INVENTION

Problems to be Solved by the Invention

Unfortunately, in the compensation of a TN mode liquid crystal display device by optical characteristics of a laminated film disclosed in Patent Literature 1, since the in-plane retardation is approximated to zero by laminating stretched films, problems arise such as occurrence of a variation in the optical axis (in-plane slow axis), a large variation in the front contrast value, and low repetitive reproducibility among liquid crystal display devices.

In the TN mode liquid crystal display device including a stretched film disclosed in Patent Literature 4, the investigation by the present inventors demonstrates that the viewing angle is narrow in the vertical direction of the screen and that the viewing angle contrast varies, which do not satisfy the recent high-level demands, regardless of high viewing angle contrast in the horizontal direction of the screen. The front contrast and the viewing angle contrast are not completely independent characteristics and have a positive correlation: the viewing angle contrast increases with an increase in front contrast. Accordingly, an improvement in the front contrast is also very effective for improving the image quality of a liquid crystal display device.

It is an object of the present invention to solve the above-mentioned problems and to provide a TN mode liquid crystal display device exhibiting improved front contrast and a suppressed variation in front contrast.

Means for Solving the Problems

Under such circumstances, the present inventors have studied and have found that the compensation range in the vertical direction can be enlarged by controlling the quantity of light emitted from a backlight unit such that the averaged light quantity in the emission angle range of 50° to 85° inclined from the normal line of the display screen of the liquid crystal display device toward the direction giving a maximum in-plane retardation is 12% or less of the light quantity in the normal line direction. At the same time, the inventors have found that light leakage occurs in a region of a large incident angle, for example, in a range of an incident angle of about 70° in this embodiment. The present inventors have further studied and have solved this problem by controlling the DI value to a certain value, and have accomplished the present invention.

Specifically, the above-mentioned problems have been solved by the following aspect <1>, preferably aspects <2> to <8>.

<1> A liquid crystal display device comprising:
a first polarizing film and a second polarizing film;
a twisted alignment mode liquid crystal cell disposed between the first polarizing film and the second polarizing film;
a first retardation film disposed between the first polarizing film and the liquid crystal cell;
a second retardation film disposed between the second polarizing film and the liquid crystal cell; and
a backlight unit with a light-collecting prism sheet which is disposed on the back side of the liquid crystal cell,
wherein the absorption axis of the first polarizing film is orthogonal to the absorption axis of the second polarizing film;
the liquid crystal cell includes a first substrate disposed nearer to the first polarizing film and a second substrate disposed nearer to the second polarizing film;
at least one of the first substrate and the second substrate includes a transparent electrode;
the transmission axis of the first polarizing film is parallel to the rubbing direction of the first substrate;
the transmission axis of the second polarizing film is parallel to the rubbing direction of the second substrate;
the first retardation film and the second retardation film each have an in-plane retardation Re(550) at a wavelength of 550 nm and a retardation Rth(550) across the thickness at a wavelength of 550 nm satisfying Formulae (I) and (II):

$$1 \text{ nm} \leq Re(550) \leq 50 \text{ nm} \tag{I}$$

$$120 \text{ nm} \leq Rth(550) \leq 220 \text{ nm} \tag{II};$$

the liquid crystal cell has a depolarizing index (DI value) of 0.000800 or less; and
the backlight unit emits backlight such that averaged light quantity in the emission angle range of 50° to 85° inclined from a normal line of a display screen of the liquid crystal display device toward a direction giving a maximum in-plane retardation is 12% or less of the light quantity in the normal line direction.

<2> A liquid crystal display device comprising:
a first polarizing film and a second polarizing film;
a twisted alignment mode liquid crystal cell disposed between the first polarizing film and the second polarizing film;
a first retardation film disposed between the first polarizing film and the liquid crystal cell;
a second retardation film disposed between the second polarizing film and the liquid crystal cell; and
a backlight unit with a light-collecting prism sheet which is disposed on the back side of the liquid crystal cell, wherein the absorption axis of the first polarizing film is orthogonal to the absorption axis of the second polarizing film;
the liquid crystal cell includes a first substrate disposed nearer to the first polarizing film and a second substrate disposed nearer to the second polarizing film;
at least one of the first substrate and the second substrate includes a transparent electrode;
the transmission axis of the first polarizing film is orthogonal to the rubbing direction of the first substrate;
the transmission axis of the second polarizing film is orthogoal to the rubbing direction of the second substrate;
the first retardation film and the second retardation film each have an in-plane retardation Re(550) at a wavelength of 550 nm and a retardation Rth(550) across the thickness at a wavelength of 550 nm satisfying Formulae (III) and (IV):

$$60 \text{ nm} \leq Re(550) \leq 120 \text{ nm} \tag{III}$$

$$120 \text{ nm} \leq Rth(550) \leq 220 \text{ nm} \tag{IV};$$

the liquid crystal cell has a depolarizing index (DI value) of 0.000800 or less; and
the backlight unit emits backlight such that the averaged light quantity in the emission angle range of 50° to 85° inclined from the normal line of the display screen of the liquid crystal display device toward the direction giving a maximum in-plane retardation is 12% or less of the light quantity in the normal line direction.

<3> The liquid crystal display device according to claim 1, wherein a P value being the product of a slow axis range of the retardation film and a Re(550) value is 10 or less, the P value being represented by the following Formula:

$$P = \text{slow axis range} \times Re(550)$$

wherein the slow axis range is a difference between a maximum and a minimum of the in-plane slow axis (unit: °) of the retardation film.

<4> The liquid crystal display device according to any one of <1> to <3>, wherein the backlight unit emits backlight with a luminous intensity having a half-value angle of 35° or more.

<5> The liquid crystal display device according to any one of <1> to <4>, wherein a direction giving a maximum in-plane retardation of the liquid crystal cell is a vertical direction when the display screen is viewed.

<6> The liquid crystal display device according to any one of <1> to <5>, wherein the prism sheet is disposed such that a protrudent portion of the sheet faces the liquid crystal cell.

<7> The liquid crystal display device according to <6>, wherein the prism sheet includes prisms having isosceles triangular cross-sections having a vertical angle of 95° to 130°.

<8> The liquid crystal display device according to any one of <1> and <3> to <6>, wherein the first and second retardation films each have a slow axis range of 2.0° or less, the slow axis range being a difference between a maximum and a minimum of the in-plane slow axis (unit: °).

Advantageous Effects of the Invention

The present invention provides TN mode liquid crystal display devices showing high front contrast with a small variation in the front contrast among the liquid crystal display devices.

EMBODIMENTS FOR CARRYING OUT THE INVENTION

Figure 1:
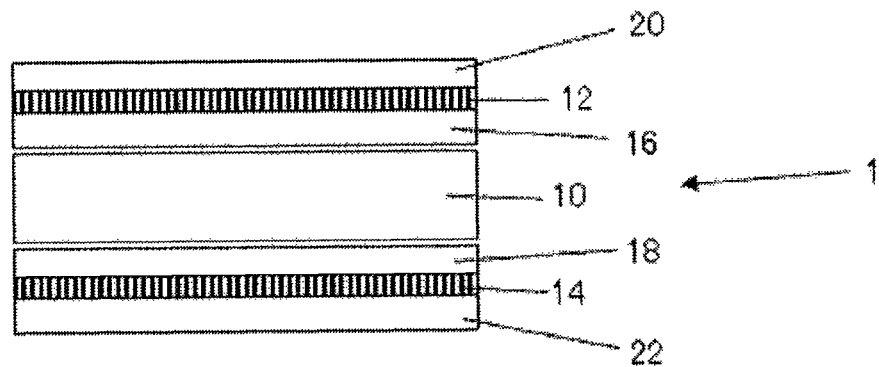
FIG. 1 is a schematic cross-sectional view of an example liquid crystal display device of the present invention.

The invention is described in detail hereinunder. Note that, in this patent specification, any numerical Formulae in a style of " . . . to . . . " will be used to indicate a range including the lower and upper limits represented by the numerals given before and after "to", respectively.

First, the terms used in the present specification are explained.

In this description, Re(λ) and Rth(λ) are retardation (nm) in plane and retardation (nm) along the thickness direction, respectively, at a wavelength of λ. Re(λ) is measured by applying light having a wavelength of λ nm to a film in the normal direction of the film, using KOBRA 21ADH or WR (by Oji Scientific Instruments). The selection of the measurement wavelength may be conducted according to the manual-exchange of the wavelength-selective-filter or according to the exchange of the measurement value by the program.

When a film to be analyzed is expressed by a monoaxial or biaxial index ellipsoid, Rth(λ) of the film is calculated as follows.

Rth(λ) is calculated by KOBRA 21ADH or WR on the basis of the six Re(λ) values which are measured for incoming light of a wavelength λ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the Rth(λ) of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (21) and (22):

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left(\sin^{-1}\left(\frac{\sin(-\theta)}{nx}\right)\right)} \quad (21)$$

$$Rth = \{(nx+ny)/2 - nz\} \times d \quad (22)$$

In the formula, nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then Rth(λ) of the film may be calculated as follows:

Re(λ) of the film is measured around the slow axis (judged by KOBRA 21ADH or WR) as the in-plane inclination axis (rotation axis), relative to the normal direction of the film from −50 degrees up to +50 degrees at intervals of degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59). KOBRA 21ADH or WR calculates nx, ny and nz, upon enter of the hypothetical values of these mean refractive indices and the film thickness. On the basis of thus-calculated nx, ny and nz, Nz=(nx−nz)/(nx−ny) is further calculated.

Throughout the specification, the Re value, the Rth, and refractive index are measured at a wavelength of 550 nm, unless otherwise specified. In addition, the measurements are performed at a temperature of 25° C. and a relative humidity of 60% RH, unless otherwise specified.

Throughout the specification, the "slow axis" means the direction of the maximum refractive index.

Throughout the specification, the term "back side" refers to the opposite side to the viewing side of a screen.

In the specification, numerical ranges and numerical values should be construed as ones including errors generally acceptable in the technical field to which the present invention pertains. In particular, the relationships of optical axes include errors acceptable in the technical field to which the present invention pertains throughout the specification.

The term "angle" in the specification is defined such that when a liquid crystal display device is viewed from the normal direction of the screen, the lower side of the screen of the liquid crystal display device apparatus is 0° and the counterclockwise direction is positive, for convenience.

Throughout the specification, the terms "parallel" and "orthogonal" each include a range within ±5° from the angle in the strict definition. The error from the angle in the strict definition is preferably less than ±4°, more preferably less than ±3°.

FIG. 1 shows a schematic cross-sectional view of an example liquid crystal display device of the present invention.

The liquid crystal display device 1 shown in FIG. 1 includes a TN mode liquid crystal cell 10, a viewing-side polarizing film 12 on one side of the cell 10, a backlight-side polarizing film 14 on the other side of the cell 10, a retardation film 16 disposed between the viewing-side polarizing film 12 and the TN mode liquid crystal cell 10, a retardation film 18 disposed between the backlight-side polarizing film 14 and the TN mode liquid crystal cell 10, a protective film 20 disposed on the outer face of the viewing-side polarizing film 12, and a protective film 22 disposed on the outer face of the backlight-side polarizing film 14.

Figure 2:
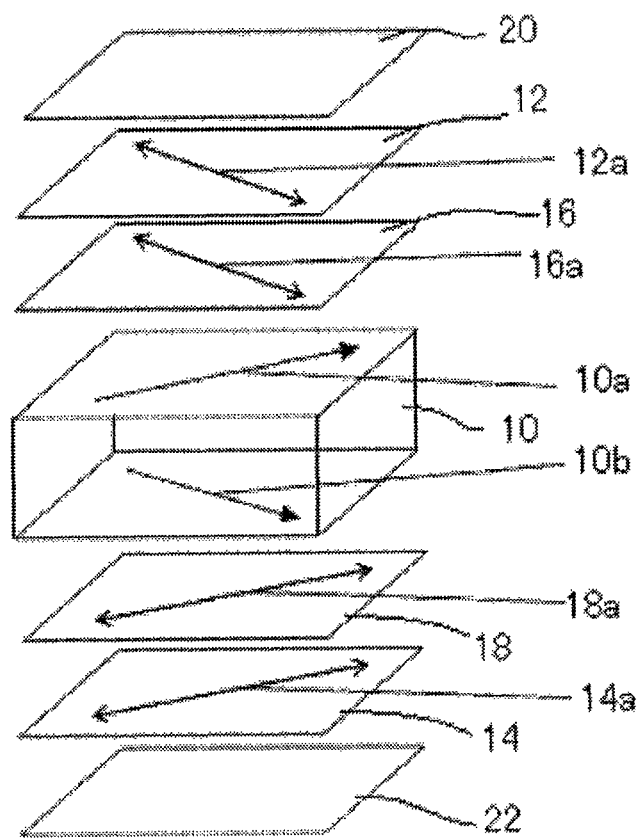
FIG. 2 is a schematic view of an example liquid crystal display device of the present invention.

In a TN mode liquid crystal display device, a pair of polarizing films is disposed in an E or O mode. FIG. 2 shows an example of the O mode arrangement. In the O mode arrangement, the directions 10a and 10b of rubbing treatment applied to the inner faces of a pair of substrates (not shown) of the liquid crystal cell 10 are respectively orthogonal to the transmission axes 12a and 14a of the polarizing films 12 and 14 disposed nearer to the substrates.

In the E mode, the directions of rubbing treatment applied to the inner faces of the pair of substrates of a liquid crystal cell are the same as or parallel to the directions of the transmission axes of the polarizing films disposed nearer to the respective substrates. In the present invention, the E mode is preferred. The E mode can reduce the variation in front contrast.

More specifically, the liquid crystal display device of a first embodiment of the present invention includes a first polarizing film, a second polarizing film, a twisted alignment mode liquid crystal cell disposed between the first polarizing film and the second polarizing film, a first retardation film disposed between the first polarizing film and the liquid crystal cell, a second retardation film disposed between the second polarizing film and the liquid crystal cell, and a backlight unit with a light-collecting prism sheet which is disposed on the back side of the liquid crystal cell. The absorption axis of the first polarizing film is orthogonal to the absorption axis of the second polarizing film. The liquid crystal cell includes a first substrate disposed nearer to the first polarizing film and a second substrate disposed nearer to the second polarizing film. At least one of the first substrate and the second substrate has a transparent electrode. The transmission axis of the first polarizing film is parallel to the rubbing direction of the first substrate. The transmission axis of the second polarizing film is parallel to the rubbing direction of the second substrate. The first retardation film and the second retardation film each have an in-plane retardation Re(550) at a wavelength of 550 nm and a retardation Rth(550) across the thickness at a wavelength of 550 nm satisfying Formulae (I) and (II):

$$1 \text{ nm} \leq Re(550) \leq 50 \text{ nm} \tag{I}$$

$$120 \text{ nm} \leq Rth(550) \leq 220 \text{ nm} \tag{II}$$

The liquid crystal cell has a depolarizing index (DI value) of 0.000800 or less. The averaged quantity of light emitted from the backlight unit within the emission angle range of 50° to 85° that is inclined from the normal line of the display screen of the liquid crystal display device toward the direction giving a maximum in-plane retardation is 12% or less of the light quantity in the normal line direction.

The liquid crystal display device of a second embodiment of the present invention is a liquid crystal display device includes a first polarizing film, a second polarizing film, a twisted alignment mode liquid crystal cell disposed between the first polarizing film and the second polarizing film, a first retardation film disposed between the first polarizing film and the liquid crystal cell, a second retardation film disposed between the second polarizing film and the liquid crystal cell, and a backlight unit with a light-collecting prism sheet which is disposed on the back side of the liquid crystal cell. The absorption axis of the first polarizing film is orthogonal to the absorption axis of the second polarizing film. The liquid crystal cell includes a first substrate disposed nearer to the first polarizing film and a second substrate disposed nearer to the second polarizing film. At least one of the first substrate and the second substrate includes a transparent electrode. The transmission axis of the first polarizing film is orthogonal to the rubbing direction of the first substrate. The transmission axis of the second polarizing film is orthogonal to the rubbing direction of the second substrate. The first retardation film and the second retardation film each have an in-plane retardation Re(550) at a wavelength of 550 nm and a retardation Rth(550) across the thickness at a wavelength of 550 nm satisfying Formulae (III) and (IV):

$$60 \text{ nm} \leq Re(550) \leq 120 \text{ nm} \tag{III}$$

$$120 \text{ nm} \leq Rth(550) \leq 220 \text{ nm} \tag{IV}$$

The liquid crystal cell has a depolarizing index (DI value) of 0.000800 or less. The averaged quantity of light emitted from the backlight unit within the emission angle range of 50° to 85° that is inclined from the normal line of the display screen of the liquid crystal display device toward the direction giving a maximum in-plane retardation is 12% or less of the light quantity in the normal line direction.

That is, the first embodiment is an E mode in which the retardations of the retardation films included in the liquid crystal display device satisfy Formulae (I) and (II), and the second embodiment is an O mode in which the retardations of the retardation films included in the liquid crystal display device satisfy Formulae (III) and (IV).

The embodiments will now be described in detail.

(1) Retardation Film (1-1) Retardation Film Used in First Embodiment

In the first embodiment of the present invention, the first and second retardation films each have an in-plane retardation Re(550) at a wavelength of 550 nm and a retardation Rth(550) across the thickness at a wavelength of 550 nm satisfying Formulae (I) and (II):

$$1 \text{ nm} \leq Re(550) \leq 50 \text{ nm} \tag{I}$$

$$120 \text{ nm} \leq Rth(550) \leq 220 \text{ nm} \tag{II}$$

Within these ranges, the optical compensation in the horizontal direction can be enhanced.

If the Re(550) value is less than 1 nm, the slow axis range described below is too large, and unevenness easily occurs in a black picture displayed on the screen.

The lower limit of the Re(550) value is preferably 2 nm, most preferably 3 nm, and the upper limit of the Re(550) value is preferably 20 nm, most preferably 10 nm.

The lower limit of the Rth(550) value is preferably 130 nm, most preferably 150 nm, and the upper limit of the Rth(550) value is preferably 200 nm.

In the present invention, if the Re(550) value is within a range of 30 to 50 nm, the in-plane slow axis of the retardation film used in the first embodiment is preferably parallel to the transmission axis of the polarizing film, whereas if the Re(550) value is within a range of 1 to 20 nm, the in-plane slow axis of the retardation film is preferably orthogonal to transmission axis of the polarizing film. If the Re(550) value is outside of these ranges, the in-plane slow axis of the retardation film may be parallel or orthogonal to the transmission axis of the polarizing film.

Such a retardation film may be produced by biaxial stretching of a specific polymer film or by addition of a retardation enhancer. The details thereof will be described below.

In the present invention, the in-plane slow axis of the retardation film used in the first embodiment can compensate for the retardation remaining in the cell, specific to a TN mode liquid crystal displaying a black picture, by shifting the in-plane slow axis by an angle θ within a range of 1° to 10° from the direction parallel or orthogonal to the transmission axis of the polarizing film. As a result, the front contrast is enhanced. On this occasion, although the angle θ should be set in such a manner that the angle θ is decreased with an increase of the in-plane retardation of the retardation film, the angle θ should be twice or more the slow axis range. The angle of the in-plane slow axis of the retardation film can be controlled by, for example, obliquely stretching the retardation film. A rolled polarizing plate may be produced from a rolled retardation film.

The retardation film used in the first embodiment of the present invention preferably has a P value, which is the product of a slow axis range and an Re(550) value, of 20 or less, more preferably 15 or less, most preferably 10 or less. Within this upper limit, the advantageous effects of the present invention can be more effectively exhibited, and the P value may be any value higher than zero.

$$P = \text{slow axis range} \times Re(550)$$

The slow axis range is the difference between a maximum and a minimum of the in-plane slow axis (unit: °) of the retardation film.

In the present invention, the slow axis range is defined as a difference between a maximum and a minimum of the in-plane slow axis azimuth (unit: °) of a retardation film. A retardation film having a smaller slow axis range is preferred.

The front contrast varies among TN mode liquid crystal display devices due to various causes. The main causes are a large slow axis range and a large in-plane retardation of the retardation film. Accordingly, it is important to reduce the product of the slow axis range and the Re(550) value, i.e., the P value defined by P=slow axis range×Re(550).

The slow axis range varies depending on the material of the retardation film and the production process such as stretching and also varies depending on the in-plane retardation. The slow axis range tends to increase with a decrease in in-plane retardation and decrease with an increase in in-plane retardation. The slow axis range in the first embodiment of the present invention is preferably 2.0° or less, more preferably 1.0° or less. Within this range, the variation in front contrast can be reduced.

The details of the method for measuring the slow axis range of a retardation film will be described in examples shown below.

The overall haze value of the retardation films 16 and 18 in the first embodiment is preferably 1.0% or less, more preferably 0.60% or less, more preferably 0.30% or less, most preferably 0.20% or less. The internal haze value is preferably 0.50% or less, more preferably 0.30% or less, most preferably 0.10% or less.

The retardation film in the first embodiment may have any thickness. In general, the thickness is preferably 10 to 100 μm, more preferably 20 to 50 μm.

(1-2) Retardation Film Used in Second Embodiment

In the second embodiment of the present invention, the first and second retardation films each have an in-plane retardation Re(550) at a wavelength of 550 nm and a retardation Rth(550) across the thickness at a wavelength of 550 nm satisfying Formulae (III) and (IV):

$$60 \text{ nm} \le Re(550) \le 120 \text{ nm} \tag{III}$$

$$120 \text{ nm} \le Rth(550) \le 220 \text{ nm} \tag{IV}$$

Within these ranges, the optical compensation in the horizontal direction can be enhanced. The Re value is preferably in a range of 85 nm≤Re(550)≤110 nm. The Rth value is preferably 130 nm≤Rth(550)≤150 nm.

In the present invention, the in-plane slow axis of the retardation film used in the second embodiment is preferably parallel to the transmission axis of the polarizing film.

Such a retardation film may be produced by biaxial stretching of a specific polymer film or by addition of a retardation enhancer. The details thereof will be described below.

The retardation film used in the second embodiment of the present invention preferably has a P value, which is the product of a slow axis range and a Re(550) value, of 40 or less. Within such a range, the effects of the present invention tend to more effectively exhibited. The P value may be a value higher than zero.

The slow axis range in the second embodiment of the present invention is preferably 0.5° or less, more preferably 0.4° or less. Within this range, an effect of reducing the variation in front contrast can be achieved.

The overall haze value of the retardation films 16 and 18 in the second embodiment is preferably 1.0% or less, more preferably 0.60% or less, more preferably 0.30% or less, most preferably 0.20% or less. The internal haze value is preferably 0.50% or less, more preferably 0.30% or less, most preferably 0.10% or less.

The retardation film in the second embodiment may have any thickness. In general, the thickness is preferably 10 to 100 μm.

Such a retardation film can be produced using, for example, a norbornene film. A desired retardation may be expressed by stretching (biaxial stretching) or may be expressed by, for example, a retardation enhancer.

(2) Polymer Material for Forming Retardation Film

The retardation film used in the present invention may be prepared with any polymer material. Examples of usable polymer material include cellulose esters, polycarbonate polymers, polyester polymers, such as polyethylene terephthalate and polyethylene naphthalate, acrylic polymers, such as poly(methyl acrylate), and styrene polymers, such as polystyrene and acrylonitrile-styrene copolymers (AS resins). Alternatively, it is possible to use a polymer film mainly composed of one or more polymers selected from polyolefins such as polyethylene and polypropylene; cyclopolyolefins such as norbornene; polyolefin copolymers such as ethylene-propylene copolymers; vinyl chloride polymers; amide polymers such as nylon and aromatic polyamide; imide polymers; sulfone polymers; polyether sulfone polymers; polyether ether ketone polymers; polyphenylene sulfide polymers; vinylidene chloride polymers; vinyl alcohol polymers; vinyl butyral polymers; acrylate polymers; polyoxymethylene polymers; epoxy polymers; and polymer blends thereof. Commonly used commercially available polymer films can also be used.

Among these polymers, a cellulose acylate film or a norbornene film is preferably used in the first embodiment. The cellulose acylate film is particularly preferred from the viewpoint of polarizing plate processability, expression of optical characteristics, transparency, mechanical characteristics, durability, cost, and other factors. A norbornene film is preferably used in the second embodiment. The cellulose acylate film and the norbornene film will now be described.

Cellulose Acylate Film
(Cellulose Acylate)

Examples of the cellulose, a raw material of the cellulose acylate used in the present invention, include cotton linters and wood pulp (hardwood pulp and softwood pulp). Cellulose acylate prepared from any cellulose material can be used, and a mixture from different materials may also be used. These cellulose materials are described in detail in, for example, "Purasuchikku zairyo koza (Plastic materials) (17) Sen-iso kei jushi (cellulose-based resin)" written by Marusawa and Uda, Nikkan Kogyo Shimbun, Ltd. (published in 1970). The celluloses described in Journal of Technical Disclosure Kogi No. 2001-1745 (pp. 7-8), Japan Institute of Invention and Innovation, can also be used. In the present invention, any cellulose acylate-laminated film can be used.

The cellulose acylate preferably used in the present invention will now be described in detail. A β-1,4 bonding glucose unit constituting cellulose has free hydroxy groups at positions 2, 3, and 6. Cellulose acylate is a polymer prepared by acylation of a part or all of these hydroxy groups with acyl groups. The degree of acyl substitution indicates the overall rate of acylation of the hydroxy groups at positions 2, 3, and 6 (100% acylation at each position corresponds to a degree of substitution of 1) of cellulose.

The acyl groups contained in the cellulose acylate used in the present invention may be of one type or two or more different types.

The acyl group of the cellulose acylate in the present invention may be an aliphatic group or an aryl group. The cellulose acylate may be, for example, an alkylcarbonyl ester, an alkenylcarbonyl ester, an aromatic carbonyl ester, or an aromatic alkylcarbonyl ester of cellulose. These esters may further include substituents. Preferred examples of the acyl group include acetyl, propionyl, butanoyl, heptanoyl, hexanoyl, octanoyl, decanoyl, dodecanoyl, tridecanoyl, tetradecanoyl, hexadecanoyl, octadecanoyl, isobutanoyl, tert-butanoyl, cyclohexanecarbonyl, oleoyl, benzoyl, naphthylcarbonyl, and cinnamoyl groups. Among these groups, more preferred are acetyl, propionyl, butanoyl, dodecanoyl, octadecanoyl, tert-butanoyl, oleoyl, benzoyl, naphthylcarbonyl, and cinnamoyl groups; particularly preferred are acetyl, propionyl, and butanoyl groups (for acyl groups having 2 to 4 carbon atoms); and most preferred are an acetyl group (for cellulose acetate).

In specific, examples of the cellulose acylate include triacetyl cellulose (TAC), diacetyl cellulose (DAC), cellulose acetate propionate (CAP), cellulose acetate butyrate (CAB), and cellulose acetate phthalate. In the cellulose acylate film used in the present invention, all the acyl groups of the cellulose acylate are preferably acetyl groups, from the viewpoint of expression of retardation and cost.

In the cellulose acylate film used in the present invention, the degree of acyl substitution of the cellulose acylate is preferably 2.0 to 2.9, more preferably 2.1 to 2.89, most preferably 2.4 to 2.86 from the viewpoint of expression of optical characteristics.

For a film used in the present invention including acyl groups having 3 or more carbon atoms, the degree of acyl substitution on acyl groups having 3 or more carbon atoms is preferably 0.3 to 1.0, more preferably 0.4 to 0.9, most preferably 0.5 to 0.8.

The degree of acyl substitution can be measured in accordance with the method prescribed in ASTM-D817-96. Hydroxy groups are usually present on the unacylated sites.

These cellulose acylates can be synthesized by a known method, for example, described in Japanese Patent Laid-Open No. No. 10-45804.

If the acylating agent used in the acylation of cellulose is an acid anhydride or chloride, the organic solvent in the reaction system is, for example, an organic acid, such as acetic acid, or methylene chloride.

If the acylating agent is an acid anhydride, a protic catalyst, such as sulfuric acid, is preferably used. If the acylating agent is an acid chloride (e.g., $CH_3CH_2COCl$), a basic compound is used.

The most typical synthetic process of an ester of cellulose with mixed fatty acids on an industrial scale involves acylation of cellulose with mixed organic acid components containing fatty acids (such as acetic acid, propionic acid, and valeric acid) or their acid anhydrides corresponding to acetyl group and other acyl groups.

The cellulose acylate preferably has a number-average molecular weight (Mn) of 40000 to 200000, more preferably 100000 to 200000. The cellulose acylate used in the present invention preferably has an Mw/Mn ratio of 4.0 or less, more preferably 1.4 to 2.3.

In the present invention, the average molecular weight and the molecular weight distribution of, for example, cellulose acylate can be calculated from the number-average molecular weight (Mn) and the weight-average molecular weight (Mw) that are determined by gel permeation chromatography (GPC), and the ratio can be calculated by the method described in International Publication No. WO2008/126535.

<Additives>

The cellulose acylate film used in the present invention can contain any additive (for example, ultraviolet absorber, plasticizer, degradation inhibitor, and optical characteristic regulator) depending on the purpose.

(1) Sugar Ester Compound and Polycondensed Ester

The cellulose acylate film used in the present invention preferably comprises at least one of the sugar ester compounds and polycondensed esters, from the viewpoint of a reduction in the internal haze of the film.

(1-1) Sugar Ester Compound
—Sugar Residue—

The sugar ester compound has at least one substituent ester-bonded to a substitutable group (e.g., a hydroxy group or a carboxy group) in the monosaccharide or polysaccharide constituting the compound. That is, examples of the sugar ester compound mentioned here include sugar derivatives in a broad sense, e.g., compounds having sugar residues, such as gluconic acid, in the structures. In other words, examples of the sugar ester compound include esters of glucose and carboxylic acids and esters of gluconic acid and alcohols.

The substitutable group in a monosaccharide or a polysaccharide constituting the sugar ester compound is preferably a hydroxy group.

The sugar ester compound includes a partial structure (hereinafter, also referred to as sugar residue) derived from a monosaccharide or a polysaccharide constituting the sugar ester compound. The partial structure derived from one monosaccharide of the sugar residues is referred to as a structural unit of the sugar ester compound. The structural unit of the sugar ester compound is preferably a pyranose structural or furanose structural unit. More preferably, all of the sugar residues are pyranose structural units or furanose structural units. A sugar ester consisting of a polysaccharide preferably includes pyranose or furanose structural units.

The sugar residue of the sugar ester compound may be derived from a pentose or a hexose and is preferably derived from a hexose.

The number of the structural units included in the sugar ester compound is preferably one to twelve, more preferably one to six, most preferably one or two.

In the present invention, the sugar ester compound preferably includes one to twelve pyranose or furanose structural units each having at least one esterified hydroxy group and more preferably includes one or two pyranose or furanose structural units each having at least one esterified hydroxy group.

Such sugars including the monosaccharides or 2 to 12 monosaccharide units are described, for example, in the description in paragraph [0035] of Japanese Patent Laid-Open No. 2012-068611, the content of which is incorporated by reference into the present specification.

Preferred examples of the sugar include ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol, and sorbitol. More preferred are arabinose, xylose, glucose, fructose, mannose, galactose, maltose, cellobiose, sucrose, β-cyclodextrin, and γ-cyclodextrin; and most preferred are xylose, glucose, fructose, mannose, galactose, maltose, cellobiose, sucrose, xylitol, and sorbitol. The sugar ester compounds having a glucose skeleton or a sucrose skeleton are preferred to the sugar ester compound having a maltose skeleton described as compound 5 and used in examples of Japanese Patent Laid-Open No. 2009-1696, from the viewpoint of compatibility with polymers.

—Structure of Substituent—

The sugar ester compound including the substituents used in the present invention more preferably has a structure represented by Formula (1):

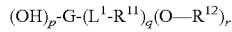

where G represents a sugar residue; $L^1$ represents —O—, —CO—, or —NR$^{13}$—; $R^{11}$ represents a hydrogen atom or a monovalent substituent; $R^{12}$ represents a monovalent substituent bonded through an ester bond; and p, q, and r each independently represent an integer of 0 or more. The sum p+q+r is equal to the number of hydroxy groups if G is an unsubstituted sugar having a cyclic acetal structure.

Preferred examples of the sugar residue represented by G are the same as those of the sugar residue described above.

$L^1$ preferably represents —O— or —CO— and more preferably —O—. If $L^1$ is —O—, the $L^1$ is preferably a linker derived from an ether or ester bond and most preferably a linker derived from an ester bond.

If two or more $L^1$s are present, they may be the same or different.

At least one of $R^{11}$ and $R^{12}$ preferably includes an aromatic ring.

In particular, if $L^1$ is —O— (that is, hydroxy groups in the sugar ester compound are substituted by $R^{11}$ and $R^{12}$), $R^{11}$, $R^{12}$, and $R^{13}$ are preferably selected from substituted or unsubstituted acyl groups, substituted or unsubstituted aryl groups, substituted or unsubstituted alkyl groups, and substituted or unsubstituted amino groups, more preferably selected from substituted or unsubstituted acyl groups, substituted or unsubstituted alkyl groups, and substituted or unsubstituted aryl groups, and most preferably selected from unsubstituted acyl groups, substituted or unsubstituted alkyl groups, and unsubstituted aryl groups.

If there are pluralities of $R^{11}$, $R^{12}$, and $R^{13}$, these may be the same or different.

The subscript p represents an integer of 0 or more. The preferred range of the integer is the same as the preferred range of the number of hydroxy groups per monosaccharide unit described below. In the present invention, p is preferably zero.

The subscript r preferably is a number larger than the number of the pyranose structural units or furanose structural units contained in G.

The subscript q is preferably zero.

Since the sum p+q+r is equal to the number of hydroxy groups if G is an unsubstituted sugar having a cyclic acetal structure, the upper limits of p, q, and r are uniquely determined from the structure represented by G.

Preferred examples of the substituent of the sugar ester compound are described in paragraph [0043] of Japanese Patent Laid-Open No. 2012-068611, the content of which is incorporated by reference into the present specification. Among them, more preferred are alkyl groups and acyl groups; more preferred are methyl, acetyl, benzoyl, and benzyl groups; and most preferred are acetyl and benzyl groups. Furthermore, in particular, when the constituent sugar of the sugar ester compound is a sucrose skeleton, the sugar ester compounds having an acetyl group and a benzyl group as substituents are preferred to the sugar ester compound having a benzoyl group described as compound 3 and used in examples of Japanese Patent Laid-Open No. 2009-1696, from the viewpoint of compatibility with polymers.

The number of hydroxy groups per structural unit (hereinafter, also referred to as hydroxy number) in the sugar ester compound is preferably 3 or less, more preferably 1 or less, most preferably zero. A hydroxy number controlled within such a range can prevent the migration of the sugar ester compound to a polarizing film layer over time under high temperature and high humidity and can prevent the decomposition of a PVA-iodine complex. Such a hydroxy number is preferred from the point of preventing the deterioration of the polarizing film performance over time under high temperature and high humidity.

In the sugar ester compound included in a film used in the present invention, all of the hydroxy groups are preferably replaced with acetyl groups and/or benzyl groups.

Regarding the proportions of the acetyl group and the benzyl group in the sugar ester compound, a relatively low proportion of the benzyl group is preferred because of a stable black tone in a liquid crystal display device including the film. Specifically, the proportion of the benzyl group is preferably 60% or less, more preferably 40% or less, based on the total number of unsubstituted hydroxy groups and all substituents in the sugar ester compound.

The sugar ester compound is commercially available from, for example, Tokyo Chemical Industry Co., Ltd. or Sigma-Aldrich Corporation or can be synthesized by any known esterification process of a commercially available carbohydrate (for example, the method describe in Japanese Patent Laid-Open No. H08-245678).

The sugar ester compound preferably has a number-average molecular weight in a range of 200 to 3500, more preferably 200 to 3000, most preferably 250 to 2000.

Examples of the sugar ester compound that can be preferably used in the present invention are described in paragraphs [0049] to [0056] of Japanese Patent Laid-Open No. 2012-068611, the content of which is incorporated by reference into the present specification.

The content of the sugar ester compound is preferably 2% to 30% by mass, more preferably 5% to 20% by mass, most preferably 5% to 15% by mass based on the amount of the polymer (preferably cellulose acylate) contained in the film used in the present invention.

In a combined use of the sugar ester compound with an additive having a negative intrinsic birefringence described below, the mass ratio of the amount (parts by mass) of the sugar ester compound to the amount (parts by mass) of the additive having a negative intrinsic birefringence is preferably 2 to 10, more preferably 3 to 8.

In a combined use of the sugar ester compound with a polyester plasticizer described below, the mass ratio of the amount (parts by mass) of the sugar ester compound to the amount (parts by mass) of the polyester plasticizer is preferably 2 to 10, more preferably 3 to 8.

The sugar ester compounds may be used alone or in a combination.

(1-2) Polycondensed Ester Compound

The polycondensed ester compound used in the present invention is preferably a polycondensed ester plasticizer having a number-average molecular weight of 300 or more and less than 2000 for preventing occurrence of haze in the film and preventing bleeding out or volatilization from the film.

The polycondensed ester compound may be of any type and is preferably a polyester plasticizer having an aromatic ring or a cycloalkyl ring in the molecule. The details of the compound are described in paragraphs [0070] to [0079] of Japanese Patent Laid-Open No. 2012-068611, the content of which is incorporated by reference into the present specification.

The optical film used in the present invention can contain a nitrogen-containing compound plasticizer and additives that can be added to usual cellulose acylate films, in addition to the sugar ester compound and the polycondensed ester mentioned above.

Examples of the additives include nitrogen-containing compound plasticizers; plasticizers other than the sugar ester compounds, the polycondensed esters, and the nitrogen-containing compound plasticizers mentioned above; nanoparticles; retardation-expressing agents; additives having negative intrinsic birefringences; antioxidants; thermal degradation inhibitors; coloring agents; and ultraviolet absorbers.

The compounds described in International Publication No. WO2008/126535 can also be preferably used as the additives.

(2) Nitrogen-Containing Aromatic Plasticizer

The optical film used in the present invention preferably contains a nitrogen-containing aromatic plasticizer. The nitrogen-containing aromatic plasticizer includes a mother nucleus of pyridine, pyrimidine, triazine, or purine and includes a substituent at any substitutable position on the mother nucleus, the substituent being an alkyl group, an alkenyl group, an alkynyl group, an amino group, an amido group (a structure having an acyl group through an amido bond), an aryl group, an alkoxy group, thioalkoxy group, an alkyl or aryl thio group (a group linking an alkyl group or an aryl group via a sulfur atom), or a heterocyclic group. The substituent at the mother nucleus of the nitrogen-containing aromatic plasticizer may also have any substituent. For example, for a mother nucleus having an amino substituent group, the amino group may have a substituent such as an alkyl group (or a plurality of alkyl groups optionally linked to each other to form a ring) or —$SO_2R'$ (R' represents a substituent). The amount of the nitrogen-containing aromatic compound used in the present invention is preferably 1% to 40% by mass, more preferably 1% to 15% by mass, most preferably 2% to 5% by mass, based on the amount of the cellulose acylate.

Examples of the nitrogen-containing aromatic plasticizer include the compounds described in paragraphs [0082] to [0101] of Japanese Patent Laid-Open No. 2012-068611, and these compounds are hereby incorporated by reference into the present specification.

(3) Plasticizer Other Than Sugar Ester Compounds, Polycondensed Esters and Nitrogen-Containing Compound Plasticizers The film used in the present invention can contain a plasticizer other than the above-mentioned sugar ester compounds, polycondensed esters, and nitrogen-containing compound plasticizers.

Preferred examples of such a plasticizer include phosphate ester plasticizers, trimellitic acid ester plasticizers, pyromellitic acid plasticizers, glycolate plasticizers, citrate ester plasticizers, carboxylate ester plasticizers, and acrylic polymers.

Examples of the phosphate ester plasticizer include triphenyl phosphate (TPP), tricresyl phosphate (TCP), cresyl diphenyl phosphate, octyl diphenyl phosphate, biphenyl diphenyl phosphate (BDP), trioctyl phosphate, and tributyl phosphate. Examples of the carboxylate ester plasticizer include dimethyl phthalate (DMP), diethyl phthalate (DEP), dibutyl phthalate (DBP), dioctyl phthalate (DOP), diphenyl phthalate (DPP), diethyl hexyl phthalate (DEHP), triethyl O-acetyl citrate (OACTE), tributyl O-acetyl citrate (OACTB), triethyl acetyl citrate, tributyl acetyl citrate, butyl oleate, methyl acetyl ricinoleate, dibutyl sebacate, triacetin, tributyrin, butylphthalylbutyl glycolate, ethylphthalylethyl glycolate, methylphthalylethyl glycolate, and butylphthalylbutyl glycolate.

Among these plasticizers, preferred are phosphate ester plasticizers, in particular, TPP and BDP. These plasticizers may be used in combination.

(4) Nanoparticles

Examples of the nanoparticles that can be added to the optical film used in the present invention include inorganic compounds, such as silicon dioxide, titanium dioxide, aluminum oxide, zirconium oxide, calcium carbonate, talc, clay, baked kaolin, baked calcium silicate, calcium silicate hydrate, aluminum silicate, magnesium silicate, and calcium phosphate.

Silicon-containing nanoparticles can reduce the haze and are preferred. In particular, silicon dioxide is preferred.

The primary particles of the nanoparticles preferably have an average particle diameter of 5 to 50 nm, more preferably 7 to 20 nm. Preferably, these particles are contained mainly in form of aggregates having diameters ranging from 0.05 to 0.3 μm.

Usable nanoparticles of silicon dioxide are commercially available, for example, under a trade name of Aerosil series R972, R972V, R974, R812, 200, 200V, 300, R202, OX50, TT600, and NAX50 (manufactured by Nippon Aerosil Co., Ltd.).

Usable nanoparticles of zirconium oxide are commercially available, for example, under the trade name of Aerosil R976 and Aerosil R811 (manufactured by Nippon Aerosil Co., Ltd.).

Examples of the polymer include silicone resins, fluorine resins, and acrylic resins. Preferred are silicone resins, in particular, silicone resins having a three-dimensional network structure. Usable silicon resins are commercially available, for example, under the trade name of Tospearl series 103, 105, 108, 120, 145, 3120, and 240 (manufactured by Toshiba Silicones Co., Ltd.).

Among these nanoparticles, particularly preferred are Aerosil 200V and Aerosil R972V that notably reduce the coefficient of friction while maintaining low haze of a cellulose derivative film.

The content of the nanoparticles is preferably 0.05% to 1% by mass, most preferably 0.1% to 0.5% by mass, based on the amount of the polymer (preferably cellulose acylate) in the film used in the present invention. A cellulose derivative film having a multilayer structure produced by co-casting preferably contains the nanoparticles within the amount mentioned above in the surface layer.

In the present invention, the optical film used in the present invention can be formed by solution casting. From the viewpoint of improving the surface condition of a film, the method of producing the film used in the present invention preferably involves a step of forming a film containing cellulose acylate as the polymer by solution casting.

Although solution casting will now be described as an example method of producing the film used in the present invention, the film may be produced by any other method. The film may be produced by known melt film formation.

<Polymer Solution>

The details of the polymer solution used in the production of a film are described in paragraphs [0127] to [0137] of Japanese Patent Laid-Open No. 2012-068611, the content of which is incorporated by reference into the present specification.

<Details of Individual Steps>

(1) Dissolution Process

The dissolution step involves dissolving cellulose acylate and additives in an organic solvent mainly composed of a good solvent for the cellulose acylate with stirring in a dissolution pot or mixing an additive solution with a cellulose acylate solution, for forming a dope.

The cellulose acylate can be dissolved under several conditions, for example, under an ordinary pressure; at a temperature not higher than the boiling point of the main solvent; at a temperature not lower than the boiling point of the main solvent under pressure; cooling dissolution described in Japanese Patent Laid-Open Nos. H09-95544, H09-95557, and H09-95538; and under high pressure as described in Japanese Patent Laid-Open No. H11-21379. In particular, the dissolution is performed at a temperature not lower than the boiling point of the main solvent under pressurization.

The concentration of cellulose acylate in the dope is preferably 10% to 35% by mass. Additives are added to the dope during or after the dissolution, and the resulting solution or dispersion is filtered through a filter. The filtrate is defoamed and is then transferred to the subsequent step with a chemical transfer pump.

In the method of producing the film used in the present invention, the viscosity of the polymer solution discharged from the discharger is controlled such that the vibration viscosity $\eta$ (unit: Pa·s) of the polymer solution measured at 25° C. and 1 Hz satisfies Formula (14). Within such a range of the vibration viscosity $\eta$, a film satisfying certain requirements can be formed by solution film forming.

$$25 \text{ Pa·s} < \eta \quad \text{Formula (14)}$$

where $\eta$ represents the vibration viscosity (unit: Pa·s) of the polymer solution discharged from a discharger measured at 25° C. and 1 Hz.

In the method of producing the film used in the present invention, the viscosity of the polymer solution discharged from the discharger is preferably controlled such that the vibration viscosity $\eta$ (unit: Pa·s) of the polymer solution measured at 25° C. and 1 Hz satisfies Formula (17):

$$30 \text{ Pa·s} < \eta < 200 \text{ Pa·s.} \quad \text{Formula (17)}$$

The viscosity of the polymer solution is more preferably 40 Pa·s<$\eta$<200 Pa·s, most preferably 40 Pa·s<$\eta$<100 Pa·s.

(2) Casting Step, Suction Step, and Molding Step

In the casting step, the polymer solution is cast from a discharger onto a traveling support. In a preferred embodiment, the dope is sent to a pressurizing die with a chemical transfer pump (e.g., high-pressure metering gear pump) and is cast from the pressurizing die slit to a casting position on a metal endless transfer support, for example, an endless stainless steel belt, or a rotating metal drum.

In the suction step, the bead portion of the cast polymer solution before reaching the support is sucked with an aspirator from the upstream side in the traveling direction of the support.

In the molding step, the polymer solution reaching the support is transported at a casting rate of 15 to 80 m/min and is molded into a film.

In the method of producing the film used in the present invention, the vibration viscosity is preferably controlled so as to satisfy Formula (14) in these casting, suction, and molding steps.

The solution film forming apparatus is mainly composed of a casting die (corresponding to the discharger), a casting band (corresponding to the traveling support), and a decompression chamber (corresponding to the aspirator).

The casting die is disposed so as to face the casting band at the position of a casting drum. From the tip end of the casting die, a dope containing a polymer material such as cellulose triacetate is extruded into a film. The extruded dope temporarily adheres to the surface of the traveling casting band and is transported.

In the method of producing the film used in the present invention, the distance $h_k$ (unit: mm) between the discharger and the support preferably satisfies Formula (13):

$$0.25 \text{ mm} \leq h_k. \quad \text{Formula (13)}$$

Such an embodiment can substantially avoid the irregularity in film thickness caused by the vibration of the discharger before the arrival of the bead portion to the support and the vibration due to suction by the aspirator described below.

The distance $h_k$ (unit: mm) between the discharger and the support preferably satisfies Formula (18):

$$0.3 \text{ mm} \leq h_k \leq 1.5 \text{ mm.} \quad \text{Formula (18)}$$

The $h_k$ is more preferably 0.5 to 1.2 mm.

In the method of producing the film used in the present invention, the clearance of the port of the discharger is controlled so as to satisfy Formula (11):

$$1.0 \times 10^6/\text{min} < [(\text{casting rate}) \times (\text{thickness of unstretched dry film})]/(\text{clearance of discharge port}) < 1.0 \times 10^7/\text{min}, \quad \text{Formula (11)}$$

$$\text{thickness of unstretched dry film} = (\text{thickness of stretched film}) \times \{1 + (\text{stretching rate in the film transporting direction (\%)})/100\} \times \{1 + (\text{stretching rate in the direction orthogonal to the film transporting direction (\%)})/100\} \quad \text{Formula (11')}$$

where the clearance of discharge port represents the lip clearance (unit: m) of the discharger; and the casting rate represents the traveling speed (unit: m/min) of the support.

Such control can eliminate a long bead portion discharged from the discharger and prevent the occurrence of irregularity in the film thickness caused by the vibration of the discharger before the arrival of the bead portion to the support and the vibration due to suction by the aspirator described below.

The lower limit of [(casting rate)×(thickness of unstretched dry film)]/(clearance of discharge port) in Formula (11) is preferably $1.1 \times 10^6/\text{min}$, more preferably $1.2 \times 10^6/\text{min}$. The upper limit of the value is preferably $9.0 \times 10^6/\text{min}$, more preferably $6.0 \times 10^6/\text{min}$.

The discharger is preferably a die, preferably a pressurizing die that can control the slit shape of the mouthpiece of the die and readily form a film with a uniform thickness. Preferably usable examples of the pressurizing die include a coat hanger die or T die. In order to increase the film-forming rate, two pressurizing dies are disposed on a metal support to divide the volume of dope, and the cast films may be layered. Alternatively, a film having a layered structure is also preferably formed through a co-casting process by simultaneously casting two or more dope solutions.

The thickness of an unstretched dry film may be adjusted so as to satisfy Formula (11), or a desired thickness may be achieved by adjusting, for example, the solid content in the dope, the slit gap of the mouthpiece of the die, the extrusion pressure from the die, or the traveling speed of the metal support.

The casting band is preferably an endless band that is preferably carried on between the casting drum and a driving drum. This casting drum preferably travels around the rotating driving drum and the casting drum.

The traveling speed of the support is adjusted to a casting rate of 15 to 80 m/min. The casting rate should be controlled to satisfy Formula (11).

The casting rate is preferably 15 to 55 m/min, more preferably 30 to 55 m/min.

The decompression chamber is disposed upstream of the cast die in the traveling direction of the casting band and is connected to a blower via a suction duct. The driven blower leads to a negative internal pressure of the decompression chamber to apply a sucking force to the surface, temporarily adhering to the casting band, of the dope in the gap between the casting die and the casting band. As a result, the cast part of the dope is stabilized even if the casting band is driven at a high speed.

In the method of producing the film used in the present invention, the suction pressure in the suction step is controlled to satisfy Formula (12):

$$-1000 \text{ Pa} < \text{suction pressure to bead portion} < -200 \text{ Pa} \quad \text{Formula (12)}$$

where the suction pressure to the bead portion represents the pressure applied to the bead portion by the aspirator and has a negative value for pulling the bead portion toward the aspirator or a positive value for pushing the bead portion from the aspirator side.

Specifically, when the suction is not performed with an aspirator, the bead portion can be deformed by suction so as to satisfy Formula (12) and also the above-described conditions. The deformation of the bead portion can substantially shorten the length of the bead portion between the discharger and the support and can make the length of the bead portion approximate the distance $h_k$ between the discharger and the support.

The suction pressure to the bead portion is preferably $-900 \text{ Pa} < \text{suction pressure to bead portion} < -300 \text{ Pa}$, more preferably $-800 \text{ Pa} < \text{suction pressure to bead portion} < -350 \text{ Pa}$.

The suction duct disposed between the decompression chamber and the blower is preferably provided with a buffer tank having a capacity 10 to 100 times that of the decompression chamber to prevent transmission of the vibration to the decompression chamber.

Thus, the solution film forming apparatus of the embodiment can produce the optical film of the present invention at a casting rate of 15 to 80 m/min. That is, an optical film having a small thickness of 20 to 60 μm, an improved uniformity in film thickness, and a lowered variation in in-plane retardation associated with a change in environmental humidity can be produced at a casting rate of 15 to 80 m/min. A film having a large thickness, such as a conventional thickness of 80 μm, can be stably produced even at a high casting rate of 50 m/min or more.

(3) Step of Evaporating Solvent

A web (referring to the dope in a state before being produced to a finished product of a cellulose acylate film and containing a large amount of a solvent) is preferably heated on a support to evaporate the solvent until the web can be peeled from the support.

The dope on the casting band is dried by evaporation of the solvent during one round of travel of the casting band, and is provided with a predetermined self-sustainability. The cast film is peeled from the casting band in the peeling step described below, for example, at a position under the casting die. Thus, a strip film is prepared.

The solvent can be evaporated, for example, by air-blowing from the web side and/or heat transfer with a liquid medium from the back face of the metal support or by radiant heat transfer from the front and back faces. The heat transfer with a liquid medium from the back face is preferred because of its high drying efficiency. A combination of these methods is also preferred. In the heat transfer with a liquid medium from the back face, the heating temperature is preferably not higher than the boiling point of the main solvent or the organic solvent having the lowest boiling point among the organic solvents contained in the dope.

(4) Peeling Step

In the peeling step, the web after evaporation of the solvent on the support is peeled off at the peeling position.

The method of producing the film used in the present invention preferably includes a step of controlling the temperature of the peeling position of the support to 0° C. or higher and then peeling the film from the support.

The peeled web is subjected to the subsequent step. If a large amount of solvent (defined by the Formulae shown below) remains in the web at the time of peeling, the web cannot be readily peeled off whereas excessive drying on the metal support has a risk of partial peeling off of the web during the drying process.

Gel casting is a known method for increasing the film-forming rate (the film-forming rate can be increased by peeling the film when a large amount of solvent still remains). Examples of such gel casting include a method by adding a poor solvent against cellulose acylate to the dope, casting the dope, and then performing gelation and a method by reducing the temperature of a metal support and then performing gelation. It is known that the film-forming rate can be increased by quick peeling off through gelation of the web on a metal support to increase the strength of the film to be peeled off. The present inventors have found that the optical films prepared by these known methods involving gelation for increasing the film-forming rate (i.e., casting rate) unfortunately have poor uniformity in film thickness. In the method of producing the film used in the present invention, however, the peeling is performed by controlling the temperature of the peeling portion of the support within the above-mentioned range, without performing gelation.

In the method of producing the film used in the present invention, the temperature of the peeling portion of the support is preferably 10° C. or more, more preferably 10° C. to 30° C.

The amount of the residual solvent in the web at the time of peeling off on the support is preferably within a range of 5% to 150% by mass from the points of, for example, strictness of the conditions for drying and the length of the support. In order to perform peeling off when a large amount of solvent still remains, the amount of the residual solvent at the time of peeling off is determined by balancing the economical rate and the quality.

The amount of the residual solvent in the web at the peeling position is preferably 10% to 150% by mass, more preferably 10% to 120% by mass.

The amount of the residual solvent can be defined by the following Formula:

Amount of residual solvent (% by mass)=$\{(M-N)/N\} \times 100$ where M represents the mass of a web at given time; and N represents the mass of the web having a mass M after drying at 110° C. for 3 hours.

(5) Drying and Stretching Step

In the method of producing a cellulose acylate film used in the present invention, the web may be stretched at any temperature within the gist of the present invention. From the viewpoint of enhancing the Formula of optical characteristics at the thickness of the resulting cellulose acylate film, however, it is preferable to stretch the web at a temperature at least 5° C. lower than the Tg (where Tg represents the glass transition temperature (° C.) of the unstretched cellulose acylate film). In particular, the film is preferably stretched at a stretching temperature at least 5° C. lower than Tg provided that the film is not preheated to the stretching temperature or higher.

After the peeling step, the web is preferably dried with a drying apparatus that transports the web by allowing the web to alternately pass through the rollers disposed in the drying apparatus and/or a tenter system that transports the web by clipping both ends of the web.

In the method of producing a cellulose acylate film used in the present invention, the web may be heated or not heated before being stretched. In the heat treatment, the web is preferably not preheated to a temperature higher than the stretching temperature, which is at least 5° C. lower than the glass transition temperature Tg of the cellulose acylate film.

The web is dried and heated usually by blowing hot air to both sides of the web. Instead of the hot air, the web may be heated with microwaves. Appropriate temperature, air flow rate, and time highly vary depending on the solvent used and may be selected depending on the types and combination of the solvents used.

In the method of producing a cellulose acylate film used in the present invention, the web may be stretched in either the film-transporting direction (hereinafter, also referred to as longitudinal direction) or the orthogonal direction (hereinafter, also referred to as transverse direction) to the film-transporting direction. The web is more preferably biaxially stretched in both longitudinal and transverse directions. The stretching may be performed through a single stage or multiple stages.

In order to achieve desired retardation in the first embodiment of the present invention, the total of the stretching rate in the film-transporting direction and the stretching rate in the direction orthogonal to the film-transporting direction is preferably 5% to 50%, more preferably 10% to 40%.

In order to achieve desired retardation in the first embodiment of the present invention, the stretching rate in the cellulose acylate film-transporting direction (longitudinal direction) is preferably 0.1% to 10%, more preferably 0.1% to 8%, most preferably 0.5% to 5%. The stretching rate (elongation) of the cellulose acylate web can be achieved by the difference between the peripheral rate of the metal support and the peeling rate (peeling roller draw). For example, in a case of using an apparatus having two nip rollers, the cellulose acylate film can be preferably stretched in the transporting direction (longitudinal direction) by setting the rate of rotation of the downstream nip roller higher than the rate of rotation of the upstream nip roller. Such stretching can adjust the Formula of retardation.

The term "stretching rate (%)" means the value determined by the following Formula:

Stretching rate (%)=$100 \times \{(\text{length after stretching})-(\text{length before stretching})\}/\text{length before stretching}$.

In order to achieve desired retardation in the first embodiment of the present invention, the stretching rate in the orthogonal direction (transverse direction) to the transporting direction of the cellulose acylate film is preferably 3% or more, more preferably 5% or more. The upper limit of the stretching rate is preferably 40%, more preferably 35%.

In the present invention, the stretching in the direction orthogonal to the film-transporting direction is preferably performed using a tenter system.

Norbornene Film

Examples of the norbornene film used in the present invention include hydrogenated ring-opened polymers of norbornene monomers, addition copolymers of norbornene monomers and olefins, addition homopolymers of norbornene monomers, and derivatives thereof. The norbornene resins may be used alone or in combination.

Examples of the norbornene monomer include bicyclo[2.2.1]hept-2-ene (norbornene) and norbornene derivatives, such as 6-methylbicyclo[2.2.1]hept-2-ene, 5,6-dimethylbicyclo[2.2.1]hept-2-ene, 1-methylbicyclo[2.2.1]hept-2-ene, 6-ethylbicyclo[2.2.1]hept-2-ene, 6-n-butylbicyclo[2.2.1]hept-2-ene, 6-isobutylbicyclo[2.2.1]hept-2-ene, and 7-methylbicyclo[2.2.1]hept-2-ene.

The hydrogenated ring-opened polymers of norbornene monomers can be prepared by ring-opening polymerization of a norbornene monomer through a known method and then hydrogenation of the remaining double bonds. The hydrogenated ring-opened polymer may be a homopolymer of a norbornene monomer or a copolymer of a norbornene monomer and another cyclic olein monomer.

Examples of the addition copolymer of norbornene monomers and olefins include copolymers of norbornene monomers and α-olefins. Any α-olefin can be used, such as an α-olefin having 2 to 20, preferably 2 to 10, carbon atoms. Examples of such olefins include ethylene, propylene, 1-butene, 3-methyl-1-butene, 1-pentene, 3-methyl-1-pentene, 4-methyl-1-pentene, 1-hexene, 1-octene, 1-decene, 1-dodecene, 1-tetradecene, and 1-hexadecene. In particular, ethylene is more preferred due to ease of copolymerization. In copolymerization of a norbornene monomer with another α-olefin, the presence of ethylene is preferred because it enhances the copolymerization reaction.

The norbornene resin may be a known one commercially available. Examples of the known norbornene resin include those described in Japanese Patent Laid-Open No. H01-240517. Examples of the commercially available norbornene resin include trade name "Arton" series manufactured by JSR Corporation and trade name "Zeonoa" series manufactured by Zeon Corporation.

Copolymers of cyclic olefins and other olefins (COC) can also be preferably used. A typical example is TOPAS manufactured by Topas Advanced Polymers GmbH.

A saturated norbornene resin having a structure mentioned below can also be used for the film of the present invention. In the present invention, the compounds described in paragraphs [0044] to [0066] of Japanese Patent Laid-Open No. 2007-328327 can be used as the saturated norbornene resin, the content of which is hereby incorporated by reference into the present specification.

The norbornene film can be preferably produced by melt film formation. The melt film formation provides a film through the steps of, for example, drying resin pellets, melt extruding the pellets, filtering the melt, extruding the melt from a die, casting the extrudate, and winding the film. Alternatively, the filtered melt may be supplied to the die through a gear pump. The details of the process are described in paragraphs [0113] to [0129] of Japanese Patent Laid-Open No. 2007-328327, the content of which is incorporated by reference into the present specification.

The unstretched norbornene film is stretched to control the Re and Rth values, and the norbornene film is used as a retardation film having a predetermined optical compensation function.

The unstretched film of the present invention formed as described above is usually stretched in the longitudinal and transverse directions. The longitudinal stretching and the transverse stretching may be each performed one or more times. The film may be simultaneously stretched in the longitudinal and transverse directions.

Such stretching may be performed in the longitudinal direction (longitudinal stretching) with two or more pairs of nip rollers among which the downstream nip rollers rotate at a higher rate compared to the upstream rollers or may be in the orthogonal direction (perpendicular to the longitudinal direction) (transverse stretching) with chucks holding both ends of the film. Alternatively, simultaneous biaxial stretching may be performed in accordance with the method described in Japanese Patent Laid-Open No. 2000-37772, 2001-113591, or 2002-103445.

In particular, the following stretching processes are preferred.

(1) Longitudinal Stretching

Longitudinal stretching can be achieved with two pairs of heated nip rollers set such that the rate of rotation of the downstream nip rollers is higher than that of the upstream nip rollers. On this occasion, the Formula of retardation (Rth) in the thickness direction can be controlled by varying the distance (L) between the nip rollers and the width (W) of an unstretched film. A ratio L/W (referred to as aspect ratio) of higher than 2 and 50 or less (long span stretching) leads to a small Rth value. An aspect ratio of 0.01 to 0.3 (short span stretching) leads to a large Rth value. Such stretching conditions can also be employed to attain desired Rth values in the first and second embodiments. The details will now be described.

(1-1) Long Span Stretching

The film is expanded by the stretching while the thickness and the width of the film being reduced for a minimum change in volume. On this occasion, the contraction in the width direction is restricted by the friction between the nip rollers and the film. Accordingly, an increase in the distance between the nip rollers readily causes contraction in the width direction and can prevent the reduction in thickness. A large reduction in the thickness has the same effect as the compression of a film in the thickness direction and promotes in-plane molecular alignment of a film to readily increase the Rth value. On the contrary, a large aspect ratio and a small reduction in the thickness preclude Formula of the Rth, and thus achieves a low Rth value.

In addition, a large aspect ratio enhances the uniformity in the width direction for the following reasons:

The longitudinal stretching causes contraction of the film in the width direction. In the central portion across the width, the contraction in the width direction is constrained by retractive stress on its both sides which contract in the width direction.

In each of both end portions in the width direction of the film, contraction occurs toward only one direction, the film is relatively freely contracted.

This difference between the end portions and the central portion in the contraction behavior associated with the stretching causes irregular stretching in the width direction.

This nonuniformity between the end portion and the central portion causes irregularity in retardation and axial distortion (alignment angle distribution of slow axis) in the width direction. In contrast, in long span stretching, the stretching is gradually performed between two long nip rollers; hence the nonuniformity is eliminated (the molecular alignment is uniformized) during the stretching. Such uniformization does not occur in usual longitudinal stretching (at an aspect ratio of higher than 0.3 and less than 2).

In order to achieve a desired Rth value of the retardation film in the second embodiment, the aspect ratio is preferably higher than 2 and 50 or less, more preferably 3 to 40, most preferably 3 to 10. The stretching temperature is preferably in a range of from a temperature 5° C. lower than the Tg to a temperature 100° C. higher than the Tg, more preferably from the Tg to a temperature 50° C. higher than the Tg, most preferably from the Tg to a temperature 30° C. higher than the Tg. The longitudinal stretching rate is preferably 5% to 100%, more preferably 10% to 60%, most preferably 20% to 50%.

In the long span stretching, a film may be stretched under heat between two pairs of nip rollers with a predetermined gap therebetween. The film may be heated with a heater (heating the film by radiant heat with, for example, an infrared heater, halogen heater, or panel heater disposed above or under the film) or zone heating (heating the film in a zone having a controlled temperature by, for example, hot air blowing). In the present invention, from the viewpoint of homogeneity in stretching temperature, the zone heating is preferred. In this method, the nip rollers may be disposed inside or outside the stretching zone. In order to prevent adhesion of a film to the nip rollers, the nip rollers are preferably disposed outside the zone. The film is preferably pre-heated before the stretching. The pre-heating temperature is preferably from a temperature 80° C. lower than the Tg to a temperature 100° C. higher than the Tg.

(1-2) Short Span Stretching

In order to achieve a desired Rth value of the retardation film in the first embodiment, the film is stretched in the longitudinal direction at an aspect ratio (L/W) of, for example, higher than 0.01 and less than 0.3, preferably 0.03 to 0.25, more preferably 0.05 to 0.2 (short span stretching). Stretching at such an aspect ratio (L/W) can reduce neck-in (contraction associated with the stretching in the direction orthogonal to the stretching). Although the thickness is reduced for compensating for the expansion in the stretching direction, this short span stretching leads to low contraction in the width and thus a preferential reduction in thickness. As a result, the alignment (plane alignment) in the thickness direction progresses by the compression in the thickness direction. Consequently, the Rth value, which is a parameter indicating the anisotropy in the thickness direction, readily increases. Conventional stretching is performed at an aspect ratio (L/W) of about 1 (0.7 to 1.5). In such a case, the stretching is usually performed under heating of the film with a heater disposed between nip rollers. At a significantly high L/W ratio, the heater cannot be installed at an appropriate site, resulting in insufficient heating.

Although the short span stretching described above can be implemented by varying the transportation rate between two or more pairs of nip rollers, the stretching can also be achieved with two pairs of nip rollers obliquely disposed (the rotation shafts of nip rollers disposed in series in the longitudinal direction are vertically shifted) (e.g., FIG. 3 of Japanese Patent Laid-Open No. 2008-3515), unlike usual disposition of rollers. Since a heater cannot be disposed between nip rollers, the film is preferably warmed with the nip rollers in which a heating medium flows. It is also preferred to heat the unstretched film by a heating medium flowing in a pre-heating roller disposed upstream of the nip roller.

The stretching temperature is preferably in a range of from a temperature 5° C. lower than the Tg to a temperature 100° C. higher than the Tg, more preferably from the Tg to a temperature 50° C. higher than the Tg, most preferably from the Tg to a temperature 30° C. higher than the Tg. The pre-heating temperature is preferably from a temperature 80° C. lower than the Tg to a temperature 100° C. higher than the Tg.

The details of the long span stretching and the short span stretching are described in paragraphs [0144] and [0145] of Japanese Patent Laid-Open No. 2007-328327, the content of which is incorporated by reference into the present specification.

(2) Transverse Stretching

A proper combination of the longitudinal stretching and transverse stretching can control the Re and Rth values. Although monoaxial stretching in either longitudinal or transverse direction is acceptable, a combination of stretching in both directions facilitates alignment in the stretching direction and readily prevents an excess increase in the absolute Re value. In addition, alignment in the longitudinal direction and alignment in the transverse direction countervail each other by a combination of longitudinal stretching and transverse stretching, resulting in a reduction in the Re value. Furthermore, the film is expanded in both longitudinal and transverse directions, resulting in a high reduction in the thickness, promoted plane alignment, and a large Rth value.

The longitudinal stretching and transverse stretching may be performed in any order. Alternatively, both may be simultaneously performed. More preferred is to perform longitudinal stretching first and then transverse stretching. This allows the facilities to be compact. Longitudinal stretching and transverse stretching may be independently performed or may be continuously performed. More preferred is continuous stretching in both directions.

The transverse stretching can be performed, for example, with a tenter. That is, stretching is performed by holding both ends in the width direction of a film with clips and widening the film in the width direction. On this occasion, the stretching temperature can be controlled by sending the air of a desired temperature inside the tenter. The stretching temperature is preferably in a range of from a temperature 10° C. lower than the Tg to a temperature 60° C. higher than the Tg, more preferably from a temperature 5° C. lower than the Tg to a temperature 45° C. higher than the Tg, most preferably from the Tg to a temperature 30° C. higher than the Tg. The stretching rate is preferably 1% to 40% in the case of expressing desired retardation in the retardation film used in the first embodiment, whereas the stretching rate is preferably 1% to 50% in the case of expressing desired retardation in the retardation film used in the second embodiment.

(3) Polarizing Film

The present invention can use any polarizing film in both the first and second embodiments. For example, a polarizing film prepared by dipping a poly(vinyl alcohol) film in an iodine solution and stretching the film can be used. The retardation film and the polarizing film can be bonded to each other with an adhesive, such as an aqueous solution of poly(vinyl alcohol) or poly(vinyl acetal) (e.g., poly(vinyl butyral)) or a latex of vinyl polymer (e.g., poly(butyl acrylate)). A particularly preferred adhesive is an aqueous solution of completely saponified poly(vinyl alcohol).

(4) Protective Film

As described above, in both the first and second embodiments, a protective film is preferably bonded on the back face of the polarizing film for protecting the polarizing film. Usable examples of the protective film are the same as those for the retardation film. Examples of the adhesive used for bonding to the polarizing film are also the same as those described above.

(5) Method of Producing Polarizing Plate

The polarizing plate may be produced by any method in the first and second embodiments. The polarizing plate may be prepared by continuously producing a long polarizing plate and then cutting it into a desired size or by producing individual pieces with a desired size and bonding them. In an example, a long polarizing film, a long retardation film, and a long protective film are prepared, and these films are laminated such that these are aligned in the longitudinal directions. This method is preferred because the method enables continuous production of polarizing plates by a roll to roll process. This method can provide a rolled polarizing plate.

<Liquid Crystal Display Device>

The liquid crystal display device of the present invention is of a twisted alignment mode (TN mode). The liquid crystal cell for the TN mode may be any liquid crystal cell having a structure proposed as that for a TN mode. The liquid crystal display device of the present invention exhibits viewing angle characteristics suitable for displays of personal use computers having a screen size of 24 inches or less, in particular, note-type PCs and tablet PCs, and smart phones.

Low-profile types compose the major proportion of the notebook-size PCs. A thin TN mode liquid crystal cell generally has a Δnd of 350 to 450 nm.

(DI Value)

In the present invention, TN mode liquid crystal cells having a DI value of 0.000800 or less are used in both the first and second embodiments. Here, the term "DI" is the acronym of depolarizing index and is used by those skilled in the art as a parameter representing the degree of depolarization of a liquid crystal cell during display of a black picture. The details of the DI value are described in Non-Patent Literature, Analysis of Light-Leakage Caused by Colour Filters for Improving Contrast Ratio of LCD-TVs, Y Utsumi, et al., (Hitachi) Euro. Disp., (2005) 301. The DI value in this document is calculated from the brightness when a liquid crystal cell is disposed between two polarizing plates in a cross Nicol arrangement and the brightness when a liquid crystal cell is disposed between two polarizing plates in a parallel Nicol arrangement. In the present invention, in order to more properly reflect the actual liquid crystal cell performance, the angle defined by two polarizing plates in a cross Nicol arrangement or a parallel Nicol arrangement is aligned, and the DI value is calculated from the brightness at the angle defined by the two polarizing plates to give the lowest brightness and the brightness at an angle giving the highest brightness. The calculation of the DI value in the present invention uses the values of brightness in front of the liquid crystal cell at a wavelength of 550 nm.

The DI value is calculated by the following formula:

$$DI=2/(1+T\text{max}/T\text{min}) \quad \text{(Formula 1)}$$

where $T\text{max}$ represents the value of brightness in display mode of a black picture of the liquid crystal cell when the upper and lower polarizing plates are disposed in a parallel Nicol state and when the highest brightness is given by fine adjustment of the angle defined by the polarizing plates; and $T\text{min}$ represents the value of brightness in a display mode of a black picture of the liquid crystal cell when the upper and lower polarizing plates are disposed in a cross Nicol state and when the lowest brightness is given by fine adjustment of the angle defined by the polarizing plates.

In actual measurement, as described in examples, the value obtained by subtracting the contribution of the polarizing plate used in the measured from the measured value is used.

The TN mode liquid crystal cell used in the present invention preferably has a DI value of 0.000800 or less, more preferably 0.000600 or less.

A DI value higher than 0.000800 is undesirable because the leakage light in the vertical direction, showing a low optically compensatory effect during displaying a black picture, is depolarized in the panel and causes leakage of light to the front to deteriorate the front contrast.

The DI value of a liquid crystal cell is affected by various components of the liquid crystal cell. The light scattering and the diffraction due to a liquid crystal material, a color filter, a black matrix, and other components increase the DI value.

In particular, the light scattering by a liquid crystal material in twisted alignment is believed to highly contribute to the DI value of the TN mode liquid crystal cell.

<Light-collecting Prism Sheet>

The liquid crystal display device of the present invention reduces light leakage of the liquid crystal display device during displaying a black picture with a light-collecting prism sheet (support provided with protrusions usually having a triangular cross section) collecting backlight, and can improve the front contrast.

The liquid crystal display device of the present invention includes the light-collecting prism sheet in the backlight unit on the back side of the TN mode liquid crystal cell. This prism sheet functions such that the collected light enters the TN mode liquid crystal cell from the vertical direction as much as possible. In this case, the averaged quantity of light emitted from the prism sheet within the emission angle range of 50° to 85° that is inclined from the normal line of the display screen of the liquid crystal display device toward the direction giving a maximum in-plane retardation of the TN mode liquid crystal cell is 12% or less, preferably 10% or less, more preferably 7% or less, most preferably 2% or less, of the light quantity in the normal line direction.

The direction giving a maximum in-plane retardation of a TN mode liquid crystal cell is determined in various manners and is, in the present invention, defined as a direction giving a maximum gradation inversion. In most of the TN mode liquid crystal cells, the rubbing directions of liquid crystal cell substrates are set in diagonal directions, i.e., +45° direction and −45° direction from the horizontal direction, in consideration of the symmetry of an image between the right and left sides. The direction giving a maximum in-plane retardation in this case is the vertical direction giving a maximum gradation inversion.

Figure 3:
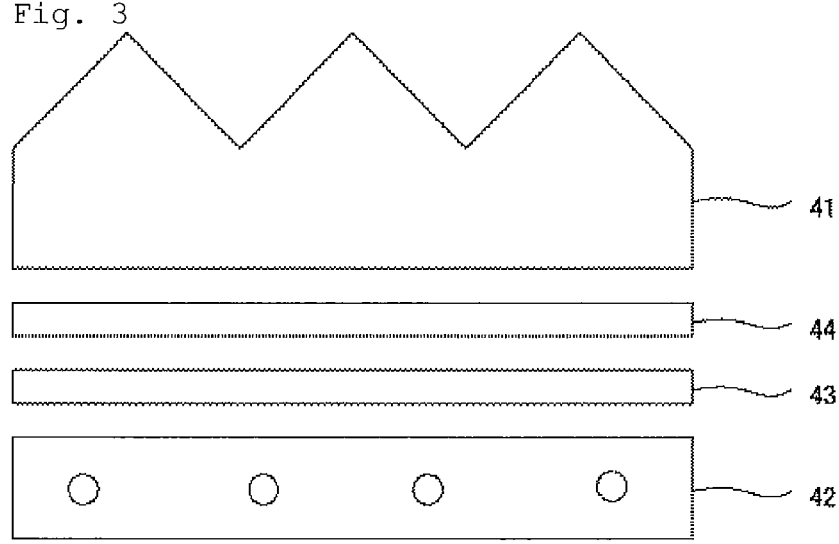
FIG. 3 is a schematic cross-sectional view illustrating the relationship between a prism sheet and a backlight disposed on the back of a liquid crystal cell.

The light-collecting prism sheet is used for collecting backlight. For example, the emitted light from a light source 42 (although a direct lit backlight unit is shown in the drawing, the same applies to a backlight unit having a light source on the side face and including a light guide) as shown in FIG. 3 enters a prism sheet (light-collecting sheet) 41. Part of the incident light is refracted by and transmitted through the prism sheet 41 to change the emitting angle and is emitted in the front direction. The remaining incident light is reflected to the direction of the light source 42. The reflected light from the prism sheet 41 is reflected by the surfaces of, for example, the light source 42, a diffuser plate 43, and a diffuser sheet 44 and then reenters the prism sheet 41.

According to such a structure, the original light emitted from a light source is distributed to a broad angle range to decrease the brightness in the front, and the prism sheet 41 can improve the directional characteristics of the light from a light source to increase the brightness in the front direction.

Figure 4:
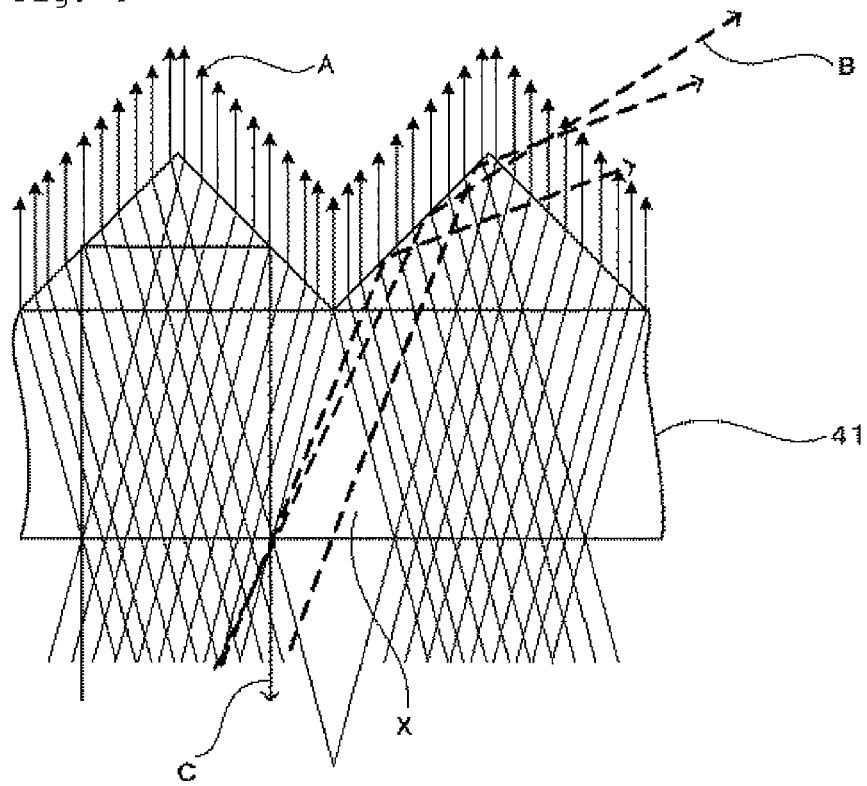
FIG. 4 is a cross-sectional view illustrating an example optical path in a prism sheet.

FIG. 4 is a cross-sectional view illustrating an example optical path in a prism sheet 41 as described above. As shown in FIG. 4, in refraction and transmission through the prism sheet 41, the incident light is separated into component A refracted to the front direction, component B refracted to directions other than the front direction and apart from the front, and component C reflected at the surface. Among these light components, component A is emitted to the front direction, i.e., the viewing direction and is light to be actually utilized. The reflected light component C is diffusively reflected at the surfaces of a diffuser sheet and other planes and enters the prism sheet at other incident angles, which allows a part of component C to be converted to component A to be emitted to the front direction. This reflection is repeated to convert most of component C into component A and to increase the brightness in the front direction of the light emission surface.

In contrast, light component B passing through the portion X shown in FIG. 4 is emitted at broad angles to the outside of the effective viewing angle of, for example, a liquid crystal display device (hereinafter, light component B is referred to as sidelobe light) and does not contribute to an increase in the front brightness.

In addition, the sidelobe light enters a liquid crystal panel at angles significantly apart from the normal direction of the screen, and the light component scattered to the front by the liquid crystal molecules of the liquid crystal cell, the color filter, the retardation film, and other planes causes a significant increase in black display brightness.

The prism sheet that is preferably used for the liquid crystal display device of the present invention and collects backlight can reduce the quantity of sidelobe light and inhibit an increase of black display brightness.

(Half-value Angle)

In the prism sheet of the present invention, the half-value angle is defined as the emission angle (an angle defined by the normal line of a screen and the direction giving a maximum in-plane retardation of the TN mode liquid crystal cell) at which the quantity of backlight emitted from the prism sheet is half the light quantity in the normal direction (the front) of the display screen of the liquid crystal display device. The half-value angle has a practical implication in that use of a prism sheet having a predetermined shape or a predetermined structure described below achieves high front contrast and can determine a practical viewing angle.

The lower limit of the half-value angle is preferably 30°, more preferably 35°. The upper limit is preferably 50°, more preferably 45°.

In the present invention, the prism sheet is disposed to collect light in the direction giving a maximum in-plane retardation of the liquid crystal cell against the normal line of the display screen of a liquid crystal display device. The display screen of a TN mode liquid crystal cell viewed from the viewer side is usually a landscape-oriented screen having the long sides in the horizontal direction. The alignment direction of the liquid crystal molecules in the liquid crystal cell are twisted by 45° to 135°. The screen is disposed such that the direction giving a maximum in-plane retardation of the TN mode liquid crystal cell is the vertical direction. In this case, the prism sheet is disposed to collect light in the vertical direction.

Highly advantageous effects can be exhibited by collecting light with the prism sheet in the direction giving a maximum in-plane retardation of the TN mode liquid crystal cell and by reducing the sidelobe light in the direction. Although such a manner of light collection is preferred, the ridge line of the prism may be inclined within a range of 1° to 20° from the black matrix of a pixel of the liquid crystal cell for inhibiting moire interference with the pixel.

The light-collecting prism sheet according to the present invention may be used together with another light-collecting sheet. For example, a light-collecting sheet can be laminated to the light-collecting prism sheet according to the present invention such that the light-collecting sheet collects light in the direction orthogonal or parallel to the direction of that of the light-collecting prism sheet.

{{Support}}

The support for producing the prism sheet has a first surface for forming light-collecting protrudent portion (prism unit) and may have any feature on shape, structure, size, thickness, and material, which can be appropriately selected depending on the purpose. For example, the support may be a plate or sheet, and may have a monolayer or multilayer structure and any size appropriately selected to meet the size of the prism sheet.

The support may have any thickness. The thickness can be appropriately selected according to the purpose and is preferably, for example, 0.005 to 4.0 mm. The thickness of the support can be measured, for example, with a thickness indicator measuring the thickness of a support placed between gauge elements or with a noncontact thickness indicator measuring the thickness of a support by optical interference.

The support may be made of any transparent material that does substantially not absorb visible light and has strength (stiffness) to some extent. The material can be appropriately selected to meet the purpose. For example, either an inorganic or organic material can be preferably used.

The stiffness indicates a physical property of the support that can be measured as tapered stiffness described in JIS P8125.

Examples of the inorganic material include glass, quartz, and elemental silicon.

Examples of the organic material include acetate resins such as triacetyl cellulose; polyester resins such as poly (ethylene terephthalate) (PET) and poly(ethylene naphthalate) (PEN); poly(ether sulfone) resins; polysulfone resins; polycarbonate resins; polyamide resins; polyimide resins; polyolefin resins; acrylic resins; polynorbornene resins; cellulose resins; polyacrylate resins; polystyrene resins; poly (vinyl alcohol) resins; poly(vinyl chloride) resins; poly (vinylidene chloride) resins; and polyacrylic resins. These materials may be used alone or in combination.

<Protrudent Portion (Prism Unit)>

The protrudent portion (prism unit) is typically composed of a large number of linear prisms arrayed in parallel. The intervals (pitches) of the linear prisms are preferably 5 to 150 μm, more preferably 10 to 100 μm. If the intervals (pitches) of the linear prisms are larger than 150 μm, glare may disadvantageously occur in a display including the prism unit, whereas if the intervals (pitches) are less than 5 μm, the linear prisms cannot be readily arrayed at regular intervals.

The linear prisms may be arrayed at any regular intervals (pitches). The intervals (pitches) can be appropriately selected to meet the purpose. The linear prisms may be disposed at irregular intervals.

In an arrangement of the linear prisms at irregular intervals (pitches), the difference among the intervals is not larger than preferably 10 times, more preferably 4 times. A difference in the intervals of larger than 10 times significantly precludes the efficiency of increasing the brightness in the front direction.

The height of the linear prisms is preferably 1 to 100 μm, more preferably 5 to 50 μm. A height of the linear prisms of lower than 1 μm decreases the efficiency of collecting light, whereas a height larger than 100 μm leads to a reduction in the mechanical strength of the prism unit to easily cause defects such as scratches or readily cause visual recognition of the protrusions to cause glare.

The protrudent portion (prism unit) preferably has a triangular cross-section, in particular, an isosceles triangular cross-section. A prism sheet having the protrusions facing the liquid crystal cell can be readily matched with a light guide and has advantageously high versatility.

The cross-section of the prism is a triangle preferably having a vertical angle of 95° to 130°, more preferably 100° to 120°. A vertical angle of 95° or more can decrease the influence of sidelobe light, can inhibit an increase in black display brightness, and can achieve a practical viewing angle. In addition, a vertical angle of 130° or less can improve the light-collecting effect and can further improve the brightness in the front direction.

In another preferred embodiment, another optical adjusting unit is provided in addition to the prism unit. In such a case, the sidelobe light can be reduced even if the vertical angle of the triangular cross-section is less than 95°.

The optical adjusting unit is composed of a plurality of optical adjusters disposed in-plane of the support with predetermined intervals and is synonymous with the optical adjusting part of the prism sheet described in Japanese Patent Laid-Open Nos. 2008-003515 and 2008-176197. Examples of the optical adjusting unit include those having light reflectivity, those having light diffusibility, and those utilizing a difference in refractive index. Preferred are optical adjusting units having light reflectivity.

The protrudent portion (prism unit) may be made of any material and is preferably made of a material having a high refractive index from the viewpoint of improving the front brightness. Examples of such a resin include organic compounds having aromatic ring structures, such as benzene and naphthalene rings, and organic compounds containing large amounts of halogen or halogens, such as Br and Cl, and/or sulfur.

Such a resin can be used as a UV curable resin in the form of a composition including, for example, a reactive group-containing compound having the structure described above and further having a reactive group, such as a (meth)acryloyl, vinyl, or epoxy group, and a compound generating an active species such as a radical or cation that is reactive with the reactive group-containing compound through exposure to radiation, such as ultraviolet rays. In particular, preferred from the point of rapid curing is a combination of a reactive group-containing compound (monomer) having an unsaturated group, such as a (meth)acryloyl or vinyl group and a photoradical polymerization initiator generating radicals by exposure to light.

Usable examples of the reactive group-containing compound include compositions each containing a compound having a reactive group, such as a (meth)acryloyl, vinyl, or epoxy group, and a compound generating an active species, such as a radical or cation that is reactive with the reactive group-containing compound by exposure to radiation, such as ultraviolet rays.

In particular, preferred from the point of rapid curing is a combination of a reactive group-containing compound (monomer) having an unsaturated group, such as a (meth) acryloyl or vinyl group, and a photoradical polymerization initiator generating radicals by exposure to light. In particular, preferred are (meth)acryloyl group-containing compounds, such as (meth)acrylates, urethane(meth)acrylates, epoxy(meth)acrylates, and polyester(meth)acrylates. Usable examples of the (meth)acryloyl group-containing compound include compounds having one or more (meth)acryloyl groups. These reactive group-containing compounds (monomers) having unsaturated groups, such as an acryloyl or vinyl group, may be used alone or in combination.

Examples of the reactive group-containing compound include (meth)acryloyl group-containing compounds, aromatic ring-containing monofunctional monomers, unsaturated monomers having two (meth)acryloyl groups in a molecule, unsaturated monomers having bisphenol skeletons, and tri- or higher functional unsaturated (meth)acrylate monomers.

Examples of the (meth)acryloyl group-containing compound include monofunctional monomers, each having a single (meth)acryloyl group, such as isobornyl(meth)acrylate, bornyl(meth)acrylate, tricyclodecanyl(meth)acrylate, dicyclopentanyl(meth)acrylate, dicyclopentenyl(meth)acrylate, cyclohexyl(meth)acrylate, benzyl(meth)acrylate, 4-butylcyclohexyl(meth)acrylate, acryloylmorpholine, 2-hydroxyethyl(meth)acrylate, 2-hydroxypropyl(meth)acrylate, 2-hydroxybutyl(meth)acrylate, methyl(meth)acrylate, ethyl (meth)acrylate, propyl(meth)acrylate, isopropyl(meth)acrylate, butyl(meth)acrylate, amyl(meth)acrylate, isobutyl (meth)acrylate, t-butyl(meth)acrylate, pentyl(meth)acrylate, isoamyl(meth)acrylate, hexyl(meth)acrylate, heptyl(meth) acrylate, octyl(meth)acrylate, isooctyl(meth)acrylate, 2-ethylhexyl(meth)acrylate, nonyl(meth)acrylate, decyl(meth) acrylate, isodecyl(meth)acrylate, undecyl(meth)acrylate, dodecyl(meth)acrylate, lauryl(meth)acrylate, stearyl(meth) acrylate, isostearyl(meth)acrylate, tetrahydrofurfuryl(meth) acrylate, butoxyethyl(meth)acrylate, ethoxydiethylene glycol(meth)acrylate, polyethylene glycol mono(meth)acrylate, polypropylene glycol mono(meth)acrylate, methoxyethylene glycol(meth)acrylate, ethoxyethyl(meth)acrylate, methoxypolyethylene glycol(meth)acrylate, and methoxypolypropylene glycol(meth)acrylate.

Examples of the aromatic ring-containing monofunctional monomer include phenoxyethyl(meth)acrylate, phenoxy-2-methylethyl(meth)acrylate, phenoxyethoxyethyl(meth)acrylate, 3-phenoxy-2-hydroxypropyl(meth)acrylate, 2-phenylphenoxyethyl(meth)acrylate, 4-phenylphenoxyethyl(meth) acrylate, 3-(2-phenylphenyl)-2-hydroxypropyl(meth) acrylate, (meth)acrylate from the reaction of ethylene oxide with p-cumylphenol, 2-bromophenoxyethyl(meth)acrylate, 4-bromophenoxyethyl(meth)acrylate, 2,4-dibromophenoxyethyl(meth)acrylate, 2,6-dibromophenoxyethyl(meth)acrylate, 2,4,6-tribromophenyl(meth)acrylate, and 2,4,6-tribromophenoxyethyl(meth)acrylate.

Examples of commercially available aromatic ring-containing monofunctional monomers include Aronix series M113, M110, M101, M102, M5700, and TO-1317 (manufactured by Toagosei Co., Ltd.), Viscoat series #192, #193, #220, and 3BM (manufactured by Osaka Organic Chemical Industry Ltd.), NK Ester AMP-10G and NK Ester AMP-20G (manufactured by Shin-Nakamura Chemical Co., Ltd.), Light Acrylate PO-A, Light Acrylate P-200A, Epoxy Ester M-600A, and Light Ester PO (manufactured by Kyoeisha Chemical Co., Ltd.), and New Frontier series PHE, CEA, PHE-2, BR-30, BR-31, BR-31M, and BR-32 (manufactured by Dai-ichi Kogyo Seiyaku Co., Ltd.).

Examples of the unsaturated monomers having two (meth)acryloyl groups in a molecule include alkyldiol diacrylates, such as 1,4-butanediol diacrylate, 1,6-hexanediol diacrylate, and 1,9-nonanediol diacrylate; polyalkylene glycol diacrylates, such as ethylene glycol di(meth)acrylate, tetraethylene glycol diacrylate, and tripropylene glycol diacrylate; neopentyl glycol di(meth)acrylate; and tricyclodecanemethanol diacrylate.

Examples of the unsaturated monomers having bisphenol skeletons include ethylene oxide adducts of bisphenol A (meth)acrylic acid esters, ethylene oxide adducts of tetrabromobisphenol A (meth)acrylic acid esters, propylene oxide adducts of bisphenol A (meth)acrylic acid esters, propylene oxide adducts of tetrabromobisphenol A (meth) acrylic acid esters, bisphenol A epoxy(meth)acrylates prepared by an epoxy ring-opening reaction between bisphenol A diglycidyl ether and (meth)acrylic acids, tetrabromobisphenol A epoxy(meth)acrylates prepared by an epoxy ring-opening reaction between tetrabromobisphenol A diglycidyl ether and (meth)acrylic acids, bisphenol F epoxy(meth) acrylates prepared by an epoxy ring-opening reaction between bisphenol F diglycidyl ether and (meth)acrylic acids, and tetrabromobisphenol F epoxy(meth)acrylates prepared by an epoxy ring-opening reaction between tetrabromobisphenol F diglycidyl ether and (meth)acrylic acids.

Examples of commercially available unsaturated monomers having such structures include Viscoat #700 and Viscoat #540 (manufactured by Osaka Organic Chemical Industry Ltd.), Aronix M-208 and Aronix M-210 (manufactured by Toagosei Co., Ltd.), NK Ester series BPE-100, BPE-200, BPE-500, and A-BPE-4 (manufactured by Shin-Nakamura Chemical Co., Ltd.), Light Ester BP-4EA, Light Ester BP-4PA, and Epoxy Ester series 3002M, 3002A, 3000M, and 3000A (manufactured by Kyoeisha Chemical Co., Ltd.), KAYARAD R-551 and KAYARAD R-712 (manufactured by Nippon Kayaku Co., Ltd.), BPE-4, BPE-10, and BR-42M (manufactured by Dai-ichi Kogyo Seiyaku Co., Ltd.), Lipoxy series VR-77, VR-60, VR-90, SP-1506, SP-1506, SP-1507, SP-1509, and SP-1563 (manufactured by Showa Highpolymer Co., Ltd.), and Neopol V779 and Neopol V779MA (manufactured by Japan U-pica Co., Ltd.).

Examples of the tri- or higher functional unsaturated (meth)acrylate monomer include (meth)acrylates of tri- or higher functional polyhydric alcohols, such as trimethylolpropane tri(meth)acrylate, pentaerythritol tri(meth)acrylate, trimethylolpropanetrioxyethyl(meth)acrylate, and tris(2-acryloyloxyethyl)isocyanurate. Examples of commercially available such unsaturated (meth)acrylate monomers include Aronix series M305, M309, M310, M315, M320, M350, M360, and M408 (manufactured by Toagosei Co., Ltd.), Viscoat series #295, #300, #360, GPT, 3PA, and #400 (manufactured by Osaka Organic Chemical Industry Ltd.), NK Ester series TMPT, A-TMPT, A-TMM-3, A-TMM-3L, and A-TMMT (manufactured by Shin-Nakamura Chemical Co., Ltd.), Light Acrylate series TMP-A, TMP-6EO-3A, PE-3A, PE-4A, and DPE-6A (manufactured by Kyoeisha Chemical Co., Ltd.), and KAYARAD series PET-30, GPO-303, TMPTA, TPA-320, DPHA, D-310, DPCA-20, and DPCA-60 (manufactured by Nippon Kayaku Co., Ltd.).

The curable composition may further contain a urethane (meth)acrylate oligomer. Examples of the urethane(meth) acrylate include polyether polyols, such as polyethylene glycol and polytetramethyl glycol; polyester polyols prepared by a reaction of a dibasic acid, such as succinic acid, adipic acid, azelaic acid, sebacic acid, phthalic acid, tetrahydrophthalic anhydride, or hexahydrophthalic anhydride, with a diol, such as ethylene glycol, propylene glycol, diethylene glycol, triethylene glycol, tetraethylene glycol, dipropylene glycol, 1,4-butanediol, 1,6-hexanediol, or neopentyl glycol; poly(ε-caprolactone)-modified polyols; poly (methyl valerolactone)-modified polyols; alkylpolyols such as ethylene glycol, propylene glycol, 1,4-butanediol, 1,6-hexanediol, and neopentyl glycol; alkylene oxide-modified polyols having a bisphenol A skeleton, such as ethylene oxide adducts of bisphenol A and propylene oxide adducts of bisphenol A; and urethane(meth)acrylate oligomers prepared from an alkylene oxide-modified polyol having a bisphenol F skeleton, such as ethylene oxide adducts of bisphenol F, propylene oxide adducts of bisphenol F, or a mixture thereof, an organic polyisocyanate, such as tolylene diisocyanate, isophorone diisocyanate, hexamethylene diisocyanate, diphenylmethane diisocyanate, or xylylene diisocyanate, and a hydroxy group-containing (meth)acrylate, such as 2-hydroxyethyl(meth)acrylate or 2-hydroxypropyl (meth)acrylate. The urethane(meth)acrylate oligomer preferably maintains an appropriate viscosity of the curable composition of the present invention.

Examples of commercially available urethane(meth)acrylate monomer include Aronix series M120, M-150, M-156, M-215, M-220, M-225, M-240, M-245, and M-270 (manufactured by Toagosei Co., Ltd.), AIB, TBA, LA, LTA, STA, Viscoat #155, IBXA, Viscoat series #158, #190, #150, and #320, HEA, HPA, Viscoat #2000, Viscoat #2100, DMA, and Viscoat series #195, #230, #260, #215, #335HP, #310HP, #310HG, and #312 (manufactured by Osaka Organic Chemical Industry Ltd.), Light Acrylate series IAA, L-A, S-A, BO-A, EC-A, MTG-A, DMP-A, THF-A, IB-XA, HOA, HOP-A, HOA-MPL, HOA-MPE, 3EG-A, 4EG-A, 9EG-A, NP-A, 1,6HX-A, and DCP-A (manufactured by Kyoeisha Chemical Co., Ltd.), KAYARAD series TC-110S, HDDA, NPGDA, TPGDA, PEG400DA, MANDA, HX-220, and HX-620 (manufactured by Nippon Kayaku Co., Ltd.), FA-511A, 512A, and 513A (manufactured by Hitachi Chemical Co., Ltd.), VP (manufactured by BASF SE), and ACMO, DMAA, and DMAPAA (manufactured by Kohjin Co., Ltd.).

The urethane(meth)acrylate oligomer is a reaction product of a hydroxy group-containing (meth)acrylate (a), an organic polyisocyanate (b), and a polyol (c), and is preferably prepared through a reaction of a hydroxy group-containing (meth)acrylate (a) and an organic polyisocyanate (b) and then a reaction of the reaction product and a polyol (c).

These unsaturated monomers may be used alone or in a mixture as necessary.

Examples of the photoradical polymerization initiator include acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoyl propyl ether, benzoyl ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethyl thioxanthone, 2-isopropyl thioxanthone, 2-chlorothioxanthone, 2-methyl-1-[4-(methylthio)phenyl]-2-morpholino-propan-1-one, 2,4,6-trimethylbenzoyl diphenylphosphine oxide, bis-(2,6-dimethoxybenzoyl)-2,4,4-trimethyl pentylphosphine oxide, and ethyl-2,4,6-trimethylbenzoyl ethoxyphenylphosphine oxide.

Examples of commercially available photoradical polymerization initiators include Irgacure series 114, 369, 651, 500, 119, 907, 714, 2959, CGI1700, CGI1750, CGI11150, and CG24-61, Darocur 1116, and Darocur 1173 (manufactured by Ciba Specialty Chemicals Inc.), Lucirin LR1728 and Lucirin 1193X (manufactured by BASF SE), Ubecryl P36 (manufactured by UCB B.A.), and KIP150 (manufactured by Lamberti S.p.A.). Among these initiators, preferred is Lucirin LR1193X, which is a solution and has high solubility and sensitivity.

The amount of the photoradical polymerization initiator is preferably 0.01% to 10% by mass, more preferably 0.5% to 7% by mass, based on the total amount of the composition. This upper limit of the blending amount is preferred from the points of, for example, curing characteristics of the composition, mechanical and optical characteristics of a cured product, and handling. Such a lower limit of the initiator content is preferred from the points of a proper curing rate.

The composition can further contain a photosensitizer. Examples of the photosensitizer include triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate. Examples of commercially available photosensitizer include Ubecryl series P102, 103, 104, and 105 (manufactured by UCB B.A.).

In addition to the above-mentioned components, the curable composition of the present invention may further contain various additives, such as an antioxidant, an ultraviolet absorber, a photostabilizer, a silane coupling agent, a painted surface modifier, a thermal polymerization inhibitor, a leveling agent, a surfactant, a coloring agent, a storage stabilizer, a plasticizer, a lubricant, a solvent, a filler, an age resistor, a wettability modifier, and a mold-releasing agent, as necessary.

Examples of the antioxidant include Irganox series 1010, 1035, 1076, and 1222 (manufactured by Ciba Specialty Chemicals Inc.) and Antigen series P, 3C, FR, and GA-10 (manufactured by Sumitomo Chemical Co., Ltd.). Examples of the ultraviolet absorber include Tinuvin series P, 234, 320, 326, 327, 328, 329, and 213 (manufactured by Ciba Specialty Chemicals Inc.) and Seesorb series 102, 103, 110, 501, 202, 712, and 704 (manufactured by Shipro Kasei Kaisha Ltd.). Examples of the photostabilizer include Tinuvin series 292, 144, and 622LD (manufactured by Ciba Specialty Chemicals Inc.), Sanol LS770 (manufactured by Sankyo Company, Ltd.), and Sumisorb TM-061 (manufactured by Sumitomo Chemical Co., Ltd.). Examples of the silane coupling agent include (γ-aminopropyl)triethoxysilane, (γ-mercaptopropyl)trimethoxysilane, and (γ-methacryloxypropyl)trimethoxysilane; and examples of commercially available silane coupling agents include SH 6062 and SH 6030 (manufactured by Dow Corning Toray Silicone Co., Ltd.), and KBE 903, KBE 603, and KBE 403 (manufactured by Shin-Etsu Chemical Co., Ltd.). Examples of the painted surface modifier include silicone additives, such as dimethylsiloxane polyether, and nonionic fluorosurfactants. Examples of commercially available silicone additives include DC-57 and DC-190 (manufactured by Dow Corning Corp.), SH-28PA, SH-29PA, SH-30PA, and SH-190 (manufactured by Dow Corning Toray Silicone Co., Ltd.), KF351, KF352, KF353, and KF354 (manufactured by Shin-Etsu Chemical Co., Ltd.), and L-700, L-7002, L-7500, and FK-024-90 (manufactured by Nippon Unicar Co., Ltd.). Examples of commercially available nonionic fluorosurfactants include FC-430 and FC-171 (manufactured by 3M Company) and Megafac series F-176, F-177, and R-08 (manufactured by DIC Corporation). Examples of the mold-releasing agent include Plysurf A208F (manufactured by Dai-ichi Kogyo Seiyaku Co., Ltd.).

The composition may contain an organic solvent for controlling the viscosity. The organic solvent for viscosity control may be any one that can completely dissolve the composition without precipitation, phase separation, or white turbidness, for example. Examples of the solvent include acetone, methyl ethyl ketone, methyl isobutyl ketone, ethanol, propanol, butanol, 2-methoxyethanol, cyclohexanol, cyclohexane, cyclohexanone, and toluene. These solvents may be used in a form of a mixture as necessary. In the use of an organic solvent, the process requires a step of drying the composition or evaporating the solvent. If a large amount of unevaporated solvent remains in the product, the product may have poor mechanical properties, and the organic solvent may evaporate or diffuse during the use of the product to cause a bad odor or adversely affect the health. Accordingly, an organic solvent having a high boiling point, which remains in a large amount in the composition, is undesirable. In contrast, an organic solvent having a low boiling point readily evaporates; this leads to a rough surface condition, water condensation on the surface of a composition due to the endothermic evaporation during the drying operation (the positions of water condensation causing planar defects), or a concentrated vapor level to increase the risk of, for example, inflammation. Accordingly, the organic solvent preferably has a boiling point of 50° C. or more and 150° C. or less, more preferably 70° C. to 120° C. The organic solvent is preferably, for example, methyl ethyl ketone (boiling point: 79.6° C.) or 1-propanol (boiling point: 97.2° C.) from the viewpoint of solubility of materials and boiling point.

Although the appropriate amount of the organic solvent added to the composition varies depending on the type of the solvent and the viscosity of the composition before the addition of the solvent, in order to significantly improve the coating characteristics, the amount is in a range of 10% to 40% by mass, preferably 15% to 30% by mass. A smaller amount of solvent insufficiently reduces the viscosity and cannot apply a sufficient amount of composition, resulting in an insufficient improvement in the coating characteristics, whereas a larger amount of solvent significantly reduces the viscosity to cause problems such as excess spread of the solution on a sheet and onto the back side of the sheet, to cause irregular coating. In addition, the solvent cannot be sufficiently evaporated in the drying step, and a large amount of the organic solvent remains in the product, resulting in risks of deterioration of the production function, occurrence of a bad odor during the use of the product due to volatilization, and a bad influence on the health.

The composition can be produced by mixing the individual components described above by an ordinary process or by dissolving the components with heating as necessary.

The composition prepared as described above usually has a viscosity of 10 to 50,000 mPa·s/25° C. If a resin solution having a significantly high viscosity is applied to a base material or embossing roller, the composition cannot be uniformly distributed onto its surface, which causes uneven coating, waviness, and bubbling during the production of a lens. The resulting lens does not have a desired thickness and satisfactory lens characteristics. In particular, such disadvantages readily occur in an operation at a high line speed. Accordingly, in this case, a low liquid viscosity is preferred, such as 10 to 100 mPa·s, more preferably 10 to 50 mPa·s. Such a low viscosity can be achieved by adding an appropriate amount of the organic solvent to the composition. Alternatively, the viscosity can be adjusted by controlling the temperature of the coating solution. Furthermore, if the viscosity after the evaporation of the solvent is too low, it is difficult to control the thickness of a lens formed by embossing with an embossing roller, and the resulting lens may have a nonuniform thickness. Accordingly, a preferred viscosity is 100 to 3,000 mPa·s. In a case of using a solvent mixture containing an organic solvent, an evaporating process step is provided to evaporate the organic solvent between the step of supplying the composition and the embossing step. A resin solution having a low viscosity can be uniformly supplied, and then the composition having a higher viscosity after the evaporation of the solvent can be embossed with an embossing roller.

The composition is cured to give a cured product. The cured product preferably has a refractive index at 25° C. of refractive index or 1.55 or more, more preferably 1.56 or more. If the refractive index is less than 1.55, the prism sheet formed of the composition may not achieve a sufficient front brightness.

The cured product preferably has a softening point of 40° C. or more, more preferably 50° C. or more. If the softening point is lower than 40° C., the heat resistance may be insufficient.

A material having a high refractive index by containing an inorganic nanoparticle material having a high refractive index can be also used. Examples of the inorganic material having a high refractive index include Si (refractive index: 3.5), $TiO_2$ (refractive index: 2.2 to 2.7), $CeO_2$ (refractive index: 2.2), $ZrO_2$ (refractive index: 2.1), $In_2O_3$ (refractive index: 2.0), $La_2O_3$ (refractive index: 1.95), $SnO_2$ (refractive index: 1.9), $Y_2O_3$ (refractive index: 1.82), and $Sb_2O_5$ (refractive index: 2.09 to 2.29).

The inorganic nanoparticles of a high refractive index preferably have a small particle diameter to give high transparency. Specifically, the particle diameter is preferably 100 nm or less, more preferably 50 nm or less, most preferably 20 nm or less.

The inorganic nanoparticles of a high refractive index can be used in the form of a mixture with a usual UV curable resin. Accordingly, a mixture of a UV curable resin having a high refractive index and the inorganic nanoparticles having a high refractive index can achieve a higher refractive index.

The prism sheet can also be produced by pressing a thermoplastic sheet of, for example, polycarbonate in a molten state to a metal original disk roller having a serrate array for a prism sheet or by extrusion-molding a thermoplastic resin through an original disk having a serrate array on one side.

(Method of Producing Prism Sheet)

In the method of producing a prism sheet of the present invention, a unit process at least including a photoresist layer-forming step, an exposure step, and an optical adjusting unit-forming step is repeated multiple times, and other steps, such as a protrudent portion-forming step, a development step (liquid development step), and a second support-forming step, are optionally performed.

In the method of producing a prism sheet in the embodiment, a unit process at least including a photoresist layer-forming step, an exposure step, and an optical adjusting unit-forming step in this order is repeated multiple times. For example, a first photoresist layer-forming step, a first exposure step, and a first optical adjusting unit-forming step are performed, and then a support layer having substantially the same optical characteristics as those of the prior support is formed. Subsequently, a second photoresist layer-forming step of forming a photoresist layer on the support layer, a second exposure step, and a second optical adjusting unit-forming step are performed. Consequently, a plurality of photoresist layers and a plurality of optical adjusting units are formed at predetermined intervals in the thickness direction of the supports.

<Step of Forming Protrudent Portion (Prism Unit)>

In the step of forming a protrudent portion (prism unit), a protrudent portion (prism unit) that collects or scatters light is formed on at least one surface (first surface) of a support. It should be noted that the protrudent portion-forming step can be omitted in a case of using a commercially available prism sheet.

The protrudent portion may be formed by any known process. For example, a coating solution containing a photocurable resin and other components is applied onto a support and is exposed to light in a state of being pressed against a die having protrusions to cure the photo-curable resin. The die is then removed.

Alternatively, the protrudent portion can also be formed by pressing a thermoplastic sheet of, for example, polycarbonate in a molten state to a metal original disk roller having a serrate array for a prism sheet or by extrusion-molding a thermoplastic resin through an original disk having a serrate array on one side.

The method of producing a support provided with a protrudent portion (prism unit) is described in, for example, paragraphs [0068] to [0086] and FIG. 3 of Japanese Patent Laid-Open No. 2008-3515, the content of which is incorporated by reference into the present specification.

The materials of the support and the protrudent portion and other details are the same as those described for the prism sheet.

EXAMPLES

Paragraphs below will further specifically describe features of the present invention, referring to Examples and Comparative Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

The individual characteristics were measured as follows.
<Expression of Optical Characteristics>

The Re and Rth values were measured at a wavelength of 550 nm with KOBRA 21ADH (manufactured by Oji Scientific Instruments) by the method described above.

<Slow Axis Angle and Slow Axis Range>

The slow axis angle and the slow axis range can be measured with an automatic polarimeter (AD-200, Eto Co., Ltd.). The in-plane slow axis angle was the mean value of in-plane slow axis angles measured at 10 points with equal intervals in the width direction of a retardation film. The slow axis angle was determined by defining the direction orthogonal to the film-transporting direction to be 0°.

The difference between the maximum value and the minimum value of in-plane slow axis angles measured at 10 points across the width of a retardation film was defined as a slow axis range.

<Measurement of DI Value of Liquid Crystal Cell>

Polarizing plates were removed from both sides of the liquid crystal cell of a commercially available TN mode liquid crystal display device to obtain a liquid crystal cell. Separately, a protective film was bonded to only one face of a polarizing plate, and the other face of the polarizing plate was bonded to a glass plate. Two single-side polarizing plates provided with glass plates were prepared in such a manner. These single-side polarizing plates were disposed on the upper and lower faces of the liquid crystal cell such that the liquid crystal cell and the single-side polarizing plates were parallel to one another. The single-side polarizing plates each had a degree of polarization of 99.995% and a degree of quenching of $5.0 \times 10^{-5}$. In order to avoid the influence by the retardation of the protective film of the single-side polarizing plate, the polarizing film was disposed so as to face the sample. A spectral emission luminance meter SR-UL1R (manufactured by Topcon Technohouse Corporation) was disposed on the outside of one of the single-side polarizing plates so as to be perpendicular to the liquid crystal cell. On the outside of the other single-side polarizing plate, a commercially available backlight for a liquid crystal display device, serving as a diffusion light source, was disposed.

The polarizing plate angle of the polarizing plate nearer to the luminance meter was adjusted with an automatic revolving stage (SGSP-60YAW, manufactured by Sigmakoki Co., Ltd.). While signals for displaying a black image were input to the liquid crystal cell, the upper and lower polarizing plates were placed in a cross Nicol arrangement. The polarizing plate angle was aligned to give the lowest brightness. The lowest brightness was defined as T(c)min. While signals for displaying a black image were input to the liquid crystal cell, the upper and lower polarizing plates were placed in a parallel Nicol arrangement. The polarizing plate angle was aligned to give the highest brightness. The highest brightness was defined as T(c)max.

Similarly, the lowest brightness and the highest brightness were measured for only the single-side polarizing plates that were provided with glass plates but not provided with a liquid crystal cell therebetween. The minimum value and the maximum value of brightness were defined as T(p)min and T(p)max, respectively.

The DI value of the liquid crystal cell was calculated from the results of these measurements in accordance with the following Formula:

$$DI \text{ value of liquid crystal cell} = 2/(1+T(c)\max/T(c)\min) - 2/(1+T(p)\max/T(p)\min). \quad \text{[Formula 2]}$$

In Examples, the DI values of cells were determined by the process described above using the TN liquid crystal cells of the following commercially available TN mode liquid crystal display devices:

P-1: commercially available TN-LCD, LS-XL2370KF, manufactured by Samsung Electronics Co., Ltd., P-2: commercially available TN-LCD, V2200ECO, manufactured by BenQ Corporation, and P-3: commercially available TN-LCD, AL2216W, manufactured by Acer Incorporated.

1. Production of Retardation Film (Production of Retardation Films 1, 2, and 3)

(1) Synthesis of Cellulose Acylate Resin

Cellulose acylate having a degree of acyl substitution of 2.43 was prepared. Sulfuric acid (7.8 parts by mass based on 100 parts by mass of cellulose) as a catalyst and each carboxylic acid were added to cellulose, followed by acylation at 40° C. Subsequently, the overall degree of substitution and the degree of position-6 substitution were adjusted by controlling the amounts of the sulfuric acid catalyst and water and the aging time. The aging temperature was 40° C. Furthermore, low-molecular-weight cellulose acylate component was removed by cleaning with acetone.

(2) Preparation of Dope

The composition shown below was placed into a mixing tank and was stirred to dissolve the individual components. The solution was further heated at 90° C. for about 10 minutes and was filtered through a filter paper having an average pore size of 34 μm and a sintered metal filter having an average pore size of 10 μm. The composition of the cellulose acylate solution used was as follows:

Cellulose Acylate Solution Used in Example 1

Cellulose acylate having a degree of acyl substitution of 2.43: 100.0 parts by mass in total Additive B1: 13.0 parts by mass Additive C1: 4.0 parts by mass Methylene chloride: 403.0 parts by mass Methanol: 60.2 parts by mass

[Formula 1]

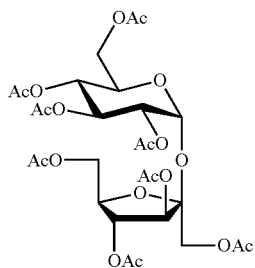

B1

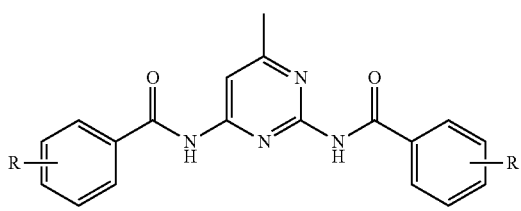

C1 where each R moiety is a 1:1 mixture of m-methyl and hydrogen.

<1-2> Matting Agent Dispersion

The following composition containing the cellulose acylate solution prepared above was placed into a disperser to prepare a matting agent dispersion.

Matting Agent Dispersion

Matting agent (Aerosil R972): 0.2 parts by mass

Methylene chloride: 72.4 parts by mass

Methanol: 10.8 parts by mass

Cellulose acylate solution: 10.3 parts by mass

The matting agent dispersion was mixed with 100 parts by mass of the cellulose acylate solution of Example 1 such that the amount of the inorganic particles was 0.02 parts by mass based on the amount of the cellulose acylate resin to prepare a dope for forming a film of Example 1. The resulting dope had a vibration viscosity of 60 Pa·s at 25° C. and 1 Hz.

(3) Casting

The above-described dope was extruded from a casting die onto the support of a band casting machine having a lip clearance of 1.0 mm to form a cast film. The band was made of stainless steel.

(4) Peeling and Drying

The web (film) prepared by casting was peeled from the band at a peeling point of 12° C. as the support temperature. Subsequently, the web was dried for 20 minutes in a tenter system that transports the web by clipping both ends of the web.

(5) Stretching

The resulting web (film) was peeled from the band and was clipped. The film was stretched in the direction (transverse or TD direction) orthogonal to the film-transporting direction at a stretching rate shown in Table 3a with a tenter when the amount of residual solvent was 5% to 30% based on the total mass of the film by fixed end uniaxial stretching. The stretching rate applied to the film in the film-transporting direction (longitudinal or MD direction) during the operation from the peeling of the band until the stretching with the tenter is shown in the following table.

The clips were then removed from the film, and the film was dried at 110° C. for 30 minutes.

TABLE 1

|  | Longitudinal stretching Stretching rate | Transverse stretching Stretching rate |
|---|---|---|
| Retardation film 1 | 5% | 11% |
| Retardation film 2 | 1% | 30% |
| Retardation film 3 | 1% | 5% |

Retardation Film (Preparation of Retardation Films 4, 5, and 6)

A pellet, TOPAS 6013 (Tg: 138° C.), manufactured by Polyplastics Co., Ltd. was dried at 110° C. with a vacuum drier to a water content of 0.1% or less and was placed into a hopper adjusted to a temperature 10° C. lower than the Tg.

The pelletized resin was molten in a kneading extruder at 260° C. The molten resin discharged from a gear pump was filtered through a leaf disc filter having a filtration accuracy of 5 μm, was transferred to a static mixer, and was then extruded from a coat hanger die having a slit pitch of 0.8 mm at 230° C. onto three casting rollers sequentially disposed and set at a temperature 5° C. lower than the glass transition temperature (Tg), the Tg, and a temperature 10° C. lower than the Tg, respectively. The first casting roller disposed at the most upstream side was brought into contact with a touch roller that was set at a linear pressure of 20 kg/cm and a temperature 7° C. lower than the Tg to solidify the cast resin to form an unstretched film.

The tough roller used was that referred to as a double hold-down roller in Example 1 of Japanese Patent Laid-Open No. H11-235747, provided that the thickness of the thin metal outer casing was 3 mm.

The resulting unstretched film roll was successively stretched in the longitudinal and transverse directions.

The longitudinal stretching was performed with two pairs of nip rollers under heat by controlling the rate of rotations of the downstream nip rollers to be higher than that of the upstream nip rollers. The Rth value was adjusted by controlling the ratio L/W of the distance (L) between the nip rollers to the width (W) of the unstretched film.

The transverse stretching was performed with a tenter stretching machine.

The conditions for the stretching are shown in the following table.

TABLE 2

|  | Longitudinal stretching | | | Transverse stretching | |
|---|---|---|---|---|---|
|  | Temp. | Stretching rate | L/W ratio | Temp. | Stretching rate |
| Retardation film 4 | 143° C. | 20% | 0.1 | 143° C. | 25% |
| Retardation film 5 | 143° C. | 35% | 3.0 | 143° C. | 3% |
| Retardation film 6 | 143° C. | 45% | 5.0 | 143° C. | 3% |

The retardation films 1 to 6 were each subjected to measurements of the Re value, Rth value, slow axis angle, and slow axis range by predetermined processes, and the P value was calculated. The results are shown in the following table.

TABLE 3

| Retardation film | Re (nm) | Rth (nm) | Slow axis angle (designed value) | Slow axis range | P value | Average thickness (μm) |
|---|---|---|---|---|---|---|
| 1 | 4 | 155 | 0° | 1.0° | 4.0 | 39 |
| 2 | 48 | 121 | 0° | 0.3° | 14.4 | 40 |
| 3 | 5 | 102 | 0° | 0.9° | 4.5 | 41 |
| 4 | 7 | 154 | 0° | 1.0° | 7.0 | 40 |
| 5 | 66 | 138 | 90° | 0.4° | 26.4 | 71 |
| 6 | 94 | 157 | 90° | 0.4° | 37.6 | 80 |

2. Production of Polarizing Plate

A protective film saponified with an aqueous sodium hydroxide solution, a long polyvinyl alcohol polarizing film (having the absorption axis in the transporting direction) having a simplex transmittance of 44.1% and a degree of polarization of 99.95%, and one of the retardation films 1 to 4 were laminated in this order with a commercially available adhesive such that these films were aligned in the longitudinal direction to produce a rolled polarizing plate for each of the retardation films 1 to 4. The protective film used was a commercially available cellulose triacylate film (Fujitac TG40, manufactured by Fujifilm Corporation).

Polarizing plates were produced with retardation film 5 or 6. The retardation films bonded such that the MD direction was orthogonal to the absorption axis of the polarizing film. The protective film was commercially available cellulose triacylate film (Fujitac TG40, manufactured by Fujifilm Corporation).

The polarizing plates were each punched at 45° into polarizing plates having predetermined sizes for TN mode liquid crystal cells with an automatic puncher.

In the polarizing plates, the slow axis was parallel to the transmission axis of the polarizing film at a slow axis angle of 0°, and the slow axis was orthogonal to the transmission axis of the polarizing film at a slow axis angle of 90°.

5. Production and Evaluation of Liquid Crystal Display Device

A prism sheet for the backlight unit was produced as follows.

<Production of Support Provided With Protrudent Portion (Prism Unit)>

A prism sheet serving as a support provided with a protrudent portion (prism unit) was produced as follows.

[Preparation of Coating Solution for Prism Layer]

A coating solution for a prism layer having the following composition was prepared.

The composition shown below was placed into a mixing tank and was stirred with heat at 50° C. to dissolve the individual components to prepare a coating solution. The prism layer after curing had a refractive index of 1.59. The refractive index of the prism layer was measured by forming a flat coating film from the same solution and measuring the refractive index of the film with a prism coupler refractometer (SPA4000, Sairon Technology Inc.).

Ebecryl 3700 (manufactured by Daicel UCB Company, Ltd.): 2.55 parts by mass

NK Ester BPE-200 (manufactured by Shin-Nakamura Chemical Co., Ltd.): 0.85 parts by mass Aronix M-110 (manufactured by Toagosei Co., Ltd.): 0.85 parts by mass New Frontier BR-31 (manufactured by Dai-ichi Kogyo Seiyaku Co., Ltd.): 4.25 parts by mass Methyl ethyl ketone: 2.89 parts by mass Lucirin TPO-L (manufactured by BASF SE): 0.17 parts by mass

[Production of Prism Sheet A]

The coating solution for a prism layer prepared above was applied onto a first surface of a PET support provided with adhesion-enhancing treatment on both surfaces and having a thickness of 25 μm at a dry mass of 14 g/m², followed by drying at 80° C. for 1 minute. Subsequently, the prism layer was pressed to a metal mold (die) carved with prism stripes having a cross section of an isosceles triangle having a vertical angle of 90° at a pitch (the length of the bottom) of 50 μm. The pressed prism layer against the metal mold was exposed to light from a second surface of the PET support with a high-pressure mercury lamp to cure the layer. The prism layer was then peeled from the metal mold to give prism sheet A (the support provided with a protrudent portion).

<Preparation of Coating Solution for White Reflection Layer>

A coating solution having the following composition for a white reflection layer to be used for forming an optical adjusting unit was prepared.

[Composition of White Pigment Dispersion Mother Solution]

Poly(vinyl butyral) (S-LEC B BL-SH, manufactured by Sekisui Chemical Co., Ltd.): 2.7 parts by mass Rutile titanium oxide (JR805, manufactured by Tayca Corporation, mass average particle diameter: 0.29 μm): 35.0 parts by mass Dispersion aid (Solsperse 20000, manufactured by Avecia Biotechnology Inc.): 0.35 parts by mass n-Propyl alcohol: 62.0 parts by mass The composition was dispersed with zirconia beads using a motor mill M50 manufactured by Eiger Japan K.K. to prepare a white pigment dispersing mother solution.

[Composition of Coating Solution for White Reflection Layer]

White pigment dispersing mother solution prepared above: 1,200 parts by mass

Wax Compounds

Stearamide (Neutron 2, manufactured by Nippon Chemical Co., Ltd.): 5.7 parts by mass Behenamide (Diamid BM, manufactured by Nippon Kasei Chemical Co., Ltd.): 5.7 parts by mass Lauramide (Diamid Y, manufactured by Nippon Kasei Chemical Co., Ltd.): 5.7 parts by mass Palmitamide (Diamid KP, manufactured by Nippon Kasei Chemical Co., Ltd.): 5.7 parts by mass Erucamide (Diamid L-200, manufactured by Nippon Kasei Chemical Co., Ltd.): 5.7 parts by mass Oleamide (Diamid O-200, manufactured by Nippon Kasei Chemical Co., Ltd.): 5.7 parts by mass Rosin (KE-311, manufactured by Arakawa Chemical Industries, Ltd., component: 80% to 97% of resin acid (resin acid components: abietic acid: 30% to 40%, neoabietic acid: 10% to 20%, dihydroabietic acid: 14%, tetrahydroabietic acid: 14%)): 80.0 parts by mass Surfactant (Megafac F-780F, solid content: 30%, manufactured by DIC Corporation): 16.0 parts by mass n-Propyl alcohol: 1,600 parts by mass Methyl ethyl ketone: 580 parts by mass <Production of White Reflection Sheet>

The coating solution for a white reflection layer prepared above was applied onto a PET support having a thickness of 25 μm to give a dry film thickness of 2 μm, followed by drying at 100° C. for 2 min to give a white reflection sheet.

<Preparation of Coating Solution for Positive Photoresist Layer>

A coating solution having the following composition for a positive photoresist layer was prepared.

Phenol novolac resin (PR-50716, melting point: 76° C., manufactured by Sumitomo Durez Co., Ltd.): 2.5 parts by mass Phenol novolac resin (PR-51600B, melting point: 55° C., manufactured by Sumitomo Durez Co., Ltd.): 3.5 parts by mass Cumylphenol 1,2-naphthoquinone-(2)-diazide-4-sulfonate: 2.0 parts by mass Methyl ethyl ketone: 40 parts by mass Propylene glycol monomethyl ether acetate: 20 parts by mass Surfactant (Megafac F-176PF, manufactured by DIC Corporation): 0.1 parts by mass <Preparation of Alkaline Developing Solution>

An alkaline developing solution having the following composition was prepared.

Sodium carbonate: 59 parts by mass

Sodium bicarbonate: 32 parts by mass

Water: 720 parts by mass

Butyl cellosolve: 1 part by mass

<Production of Light-collecting Prism Sheet B>

Figure 5:
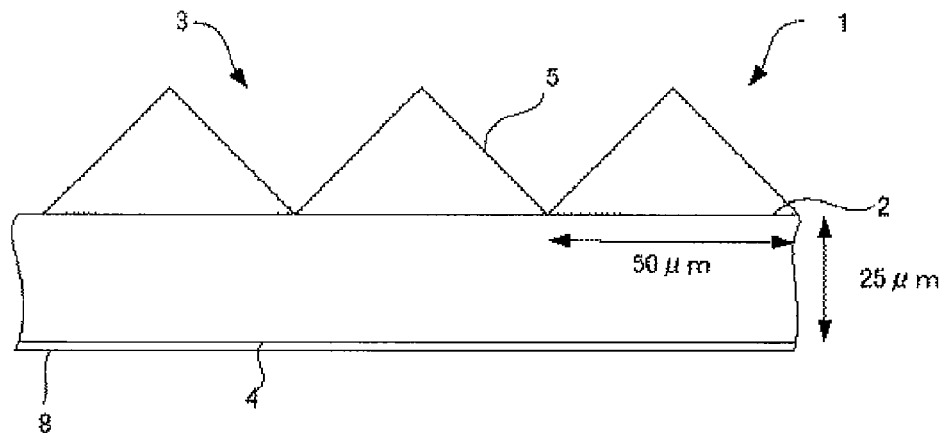
FIG. 5 is a schematic cross-sectional view of prism sheet A comprising a positive photoresist layer 8 formed on the second surface 4 of a support 2.

As shown in FIG. 5, the coating solution for a positive photoresist layer prepared above was applied onto the flat second surface 4 of the prism sheet A (the support 2 provided with a protrudent portion 5) prepared above to give a dry film thickness of 0.5 μm, followed by drying at 100° C. for 2 minutes. A positive photoresist layer 8 was thereby formed on the second surface 4 of the support 2.

Figure 6:
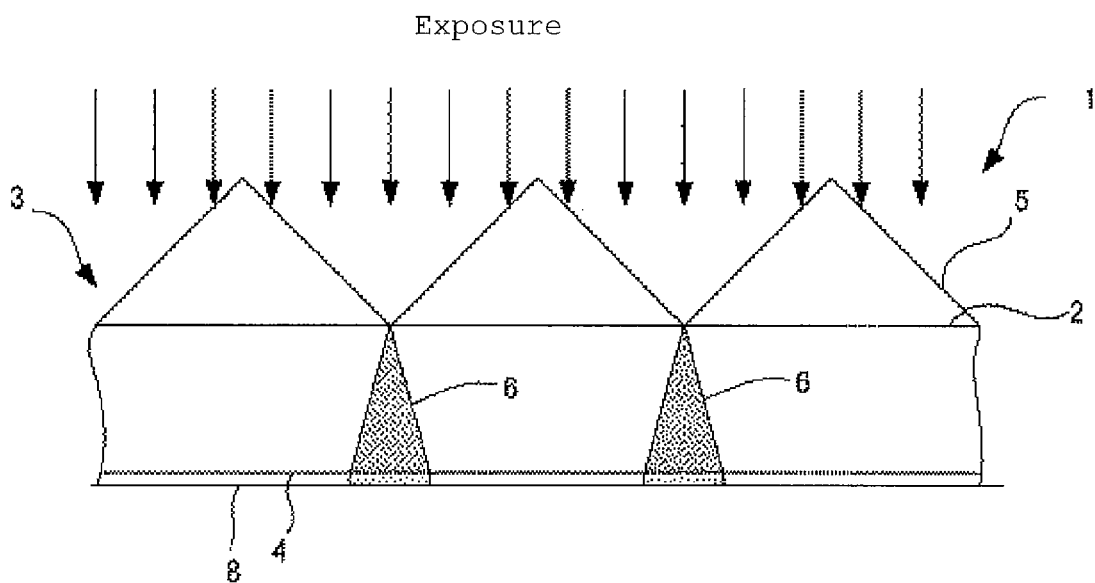
FIG. 6 is a schematic cross-sectional view illustrating a state of an exposed prism sheet A comprising a positive photoresist layer 8 formed on the second surface 4 of a support 2.

Subsequently, as shown in FIG. 6, the first surface 3 provided with protrudent portion 5 of the support 2 was irradiated with ultraviolet rays being parallel to the normal line of the flat second surface 4 with a collimated light irradiation apparatus (mask alignment system M-2L, manufactured by Mikasa Co., Ltd.). The positive photoresist layer was exposed to light. In FIG. 6, the portion indicated by numeral 6 is a portion through which light does not pass (portion having a low luminous flux density).

Figure 7:
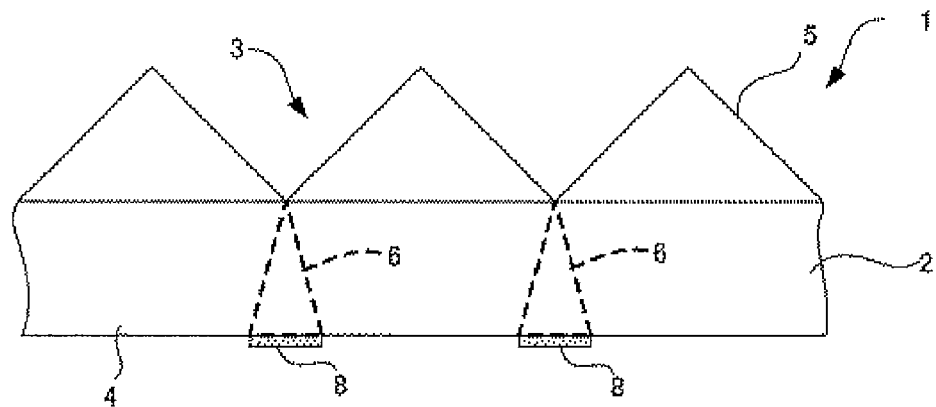
FIG. 7 is a schematic cross-sectional view illustrating a state of the exposed area cleaned after the exposure shown in FIG. 6.

Subsequently, the exposed area of the positive photoresist layer was removed with the alkaline developing solution prepared above. The support 2 had a partially remaining positive photoresist layer 8 on the second surface 4 at the light-impermeable portion 6, as shown in FIG. 7.

Figure 8:
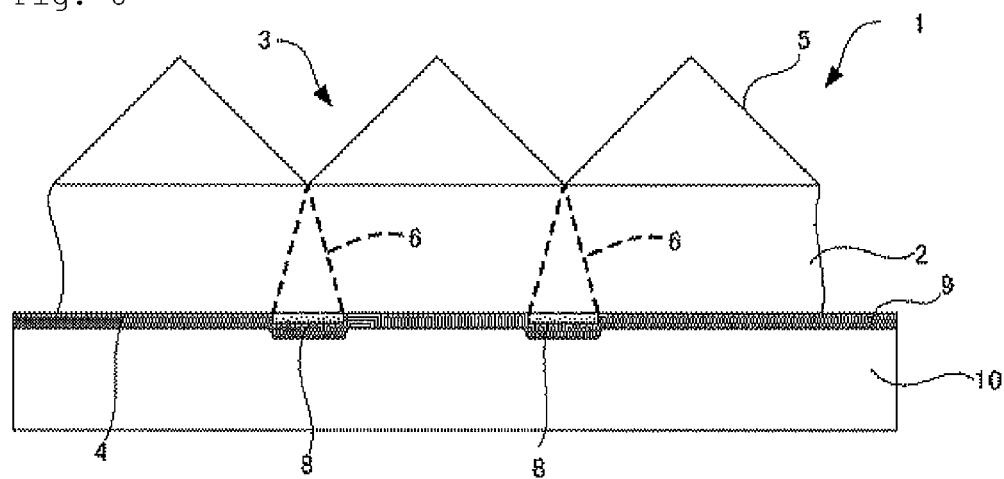
FIG. 8 is a schematic cross-sectional view illustrating a state of a white reflection sheet 40 disposed on the support 2.
Figure 9:
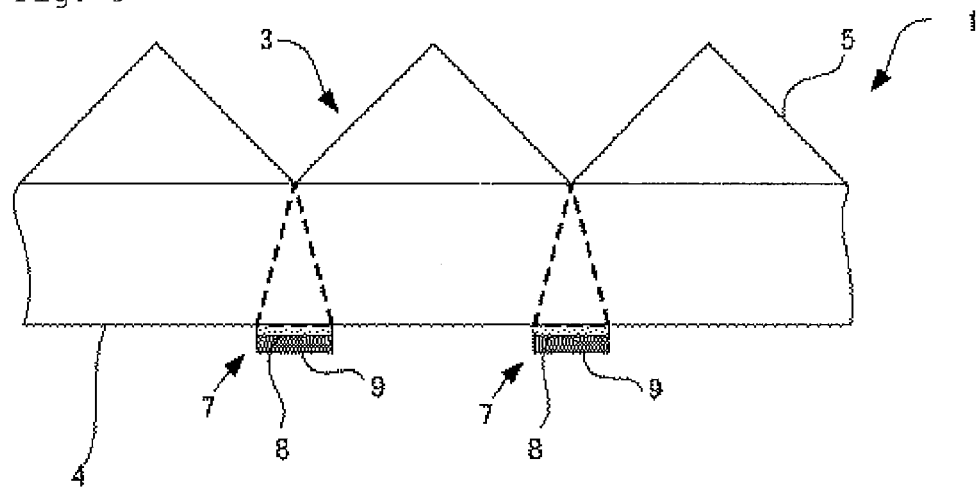
FIG. 9 is a schematic cross-sectional view illustrating a state of the white reflection sheet 40 peeled from the support 2.

As shown in FIG. 8, the white reflection sheet 10 provided with the white reflection layer 9 was disposed on the second surface 4 of the support 2 having the partially remaining positive photoresist layer 8 such that the white reflection layer 9 was brought into contact with the positive photoresist layer 8 having adhesiveness and the second surface 4, and the white reflection sheet 10 was thermally laminated to the support 2 (rate: 0.5 m/min, heating temperature: 80° C.) with a laminator. Subsequently, as shown in FIG. 9, the white reflection sheet 10 was peeled from the support 2. This process yields a prism sheet B, including the support 2 onto which the white reflection layer 9 in a form of stripes having a width of 12 μm was transferred in the portion formed with the positive photoresist layer 8. The white reflection layer 9 is a sidelobe preventing portion 7 having an optical reflectance of 70%.

[Production of Prism Sheet C]

The coating solution for a prism layer prepared above was applied onto a first surface of a PET support provided with adhesion-enhancing treatment on both surfaces and having a thickness of 25 μm at a dry mass of 14 g/m², followed by drying at 80° C. for 1 minute. The prism layer was then pressed to a metal mold (die) carved with prism stripes having a cross section of an isosceles triangle having a vertical angle of 110° at a pitch (the length of the bottom) of 50 μm. The pressed prism layer against the metal mold was exposed to light from a second surface of the PET support with a high-pressure mercury lamp to cure the layer. The prism layer was then peeled from the metal mold to give prism sheet C (the support provided with a protrudent portion).

<Attachment of Prism Sheet>

The prism sheet A having a vertical angle of 90°, the prism sheet B having a vertical angle of 90° and serving as a light-collecting prism sheet partially provided with a plurality of sidelobe preventing portions 7 having light reflectivity, and the prism sheet C having a vertical angle of 110° were respectively attached to backlight units such that the protrudent portion faced the liquid crystal cell side.

<Measurement of Emission Angle Distribution of Backlight>

The backlight source, provided with the prism sheet, for a liquid crystal display device was subjected to measurement of the luminous intensity with a luminance meter (BM-7, Topcon Corporation).

The angle distribution of the luminous intensity emitted from each prism sheet was measured by scanning the prism sheet with a photoreceiver at every 5° against the light-collecting direction ranging from +85° to −85° defining the front to be 0°. The average value of the light quantities measured in the emission angle range of 50° to 85° was determined. The results are shown in the following table (hereinafter, the average may be also referred to as "50°-85° average value").

Figure 10:
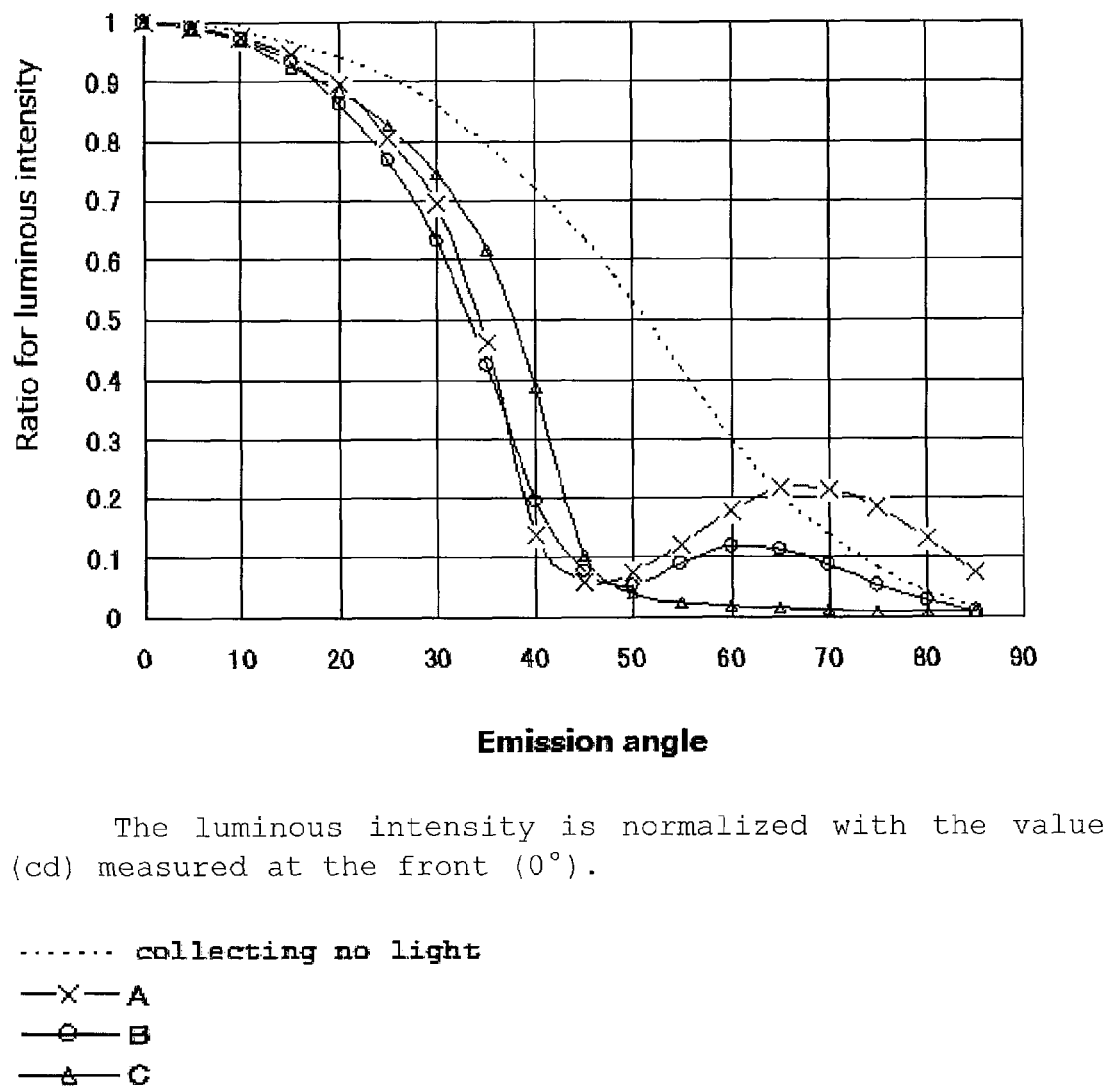
FIG. 10 is a graph illustrating the relationship between the luminous intensity and the emission angle of each prism sheet, where the luminous intensity is normalized with the value (cd) measured at the front (0°).

The relationship between the luminous intensity and the emission angle of each prism sheet is shown in FIG. 10 by normalizing the luminous intensity with the value (cd) of the luminous intensity measured at the front (0°).

<Measurement of Half-value Angle>

The emission angle showing a luminous intensity being ½ of the luminous intensity (cd) measured at the front (0°) was determined from the relationship between the luminous intensity and the emission angle of 0° to 85° and was defined as the half-value angle.

Example 1

Liquid crystal display devices (displays) were assembled in the combinations of the retardation film (polarizing plate), the TN mode liquid crystal cell, and the prism sheet for backlight unit (light-collecting sheet) shown in the following table. The step of bonding the polarizing plates punched at 45° to the both sides of a liquid crystal panel was performed with an automatic sticking device.

The liquid crystal cell was a commercially available one. The direction giving a maximum in-plane retardation of the TN mode liquid crystal cell was the vertical direction in order to dispose the screen such that the long side and the short side were disposed in the horizontal direction and the vertical direction, respectively.

Each prism sheet was disposed such that the protrudent portion faced the liquid crystal cell and that the light was collected in the vertical direction or the horizontal direction as shown in the following table.

The display performance of the liquid crystal display device was evaluated for the following items in a dark place at 25° C. and 60% RH.

<Process for Evaluating Front Contrast>

In the measurement of front contrast, a single polarizing plate was punched at 10 points across the width at equal intervals and was bonded to a display of each display level. Twenty display samples were thereby produced in total and were measured for the front contrast in an environment of 25° C. and 60% RH with a contrast measuring machine (EZContrast, manufactured by ELDIM). The average value was determined.

The front contrast value of each display was evaluated as a relative ratio to that of the display 01, a reference, and was ranked according to the following criteria. The rank D is the reference score.

A: relative ratio of the front contrast of 1.25 or more

B: relative ratio of the front contrast of 1.15 or more and less than 1.25

C: relative ratio of the front contrast of 1.05 or more and less than 1.15

D: relative ratio of the front contrast of less than 1.05

<Evaluation of Variation in Front Contrast (Repeatability of Front Contrast Value Among Liquid Crystal Display Devices)>

The front contrast values of the 20 samples at the same display level were evaluated by the following criteria. The rank B is the reference score.

A: the difference between the maximum and the minimum in 20 times measurements is less than 5% of the average value of front contrast B: the difference between the maximum and the minimum in 20 times measurements is 5% or more and less than 10% of the average value of front contrast C: the difference between the maximum and the minimum in 20 times measurements is 10% or more and less than 15% of the average value of front contrast D: the difference between the maximum and the minimum in 20 times measurements is 15% or more The results of the evaluation are shown in the following table.

The results of the evaluation of the front contrast and the variation in the front contrast are shown in the following table.

TABLE 4

| | | Bonding direction of polarizing plate | TN cell | | Backlight unit | | | |
|---|---|---|---|---|---|---|---|---|
| | Retardation film | | No | DI value of cell | Prism sheet | Light-collecting direction | Half-value angle | 50°-85° average light quantity |
| Display 01 | 1 | E mode | P-1 | 0.000760 | None | — | 52° | 22% |
| Display 02 | 1 | E mode | P-1 | 0.000760 | A | Vertical | 34° | 15% |
| Display 03 | 1 | E mode | P-1 | 0.000760 | B | Vertical | 33° | 6.9% |
| Display 04 | 1 | E mode | P-1 | 0.000760 | C | Vertical | 38° | 1.8% |

TABLE 4-continued

|  | Retardation film | Bonding direction of polarizing plate | TN cell No | DI value of cell | Prism sheet | Backlight unit Light-collecting direction | Half-value angle | 50°-85° average light quantity |
|---|---|---|---|---|---|---|---|---|
| Display 05 | 1 | E mode | P-1 | 0.000760 | C | Horizontal | 38° | 1.8% |
| Display 06 | 2 | E mode | P-1 | 0.000760 | C | Vertical | 38° | 1.8% |
| Display 07 | 3 | E mode | P-1 | 0.000760 | C | Vertical | 38° | 1.8% |
| Display 08 | 4 | E mode | P-1 | 0.000760 | C | Vertical | 38° | 1.8% |
| Display 09 | 5 | E mode | P-1 | 0.000760 | C | Vertical | 38° | 1.8% |
| Display 10 | 1 | E mode | P-2 | 0.000590 | C | Vertical | 38° | 1.8% |
| Display 11 | 2 | E mode | P-2 | 0.000590 | C | Vertical | 38° | 1.8% |
| Display 12 | 3 | E mode | P-2 | 0.000590 | C | Vertical | 38° | 1.8% |
| Display 13 | 4 | E mode | P-2 | 0.000590 | C | Vertical | 38° | 1.8% |
| Display 14 | 5 | E mode | P-2 | 0.000590 | C | Vertical | 38° | 1.8% |
| Display 15 | 1 | E mode | P-3 | 0.000875 | C | Vertical | 38° | 1.8% |
| Display 16 | 2 | E mode | P-3 | 0.000875 | C | Vertical | 38° | 1.8% |
| Display 17 | 4 | E mode | P-3 | 0.000875 | C | Vertical | 38° | 1.8% |

TABLE 5

|  | Performance | | |
|---|---|---|---|
|  | Average value of front contrast | Variation in front contrast | |
| Display 01 | D | A | Comparative Example |
| Display 02 | D | A | Comparative Example |
| Display 03 | C | A | Example |
| Display 04 | C | A | Example |
| Display 05 | D | A | Comparative Example |
| Display 06 | C | B | Example |
| Display 07 | D | A | Comparative Example |
| Display 08 | C | A | Example |
| Display 09 | D | A | Comparative Example |
| Display 10 | B | A | Example |
| Display 11 | C | B | Example |
| Display 12 | D | A | Comparative Example |
| Display 13 | B | A | Example |
| Display 14 | D | A | Comparative Example |
| Display 15 | D | A | Comparative Example |
| Display 16 | D | A | Comparative Example |
| Display 17 | D | A | Comparative Example |

The results demonstrate that all of the displays of the present invention (displays 03, 04, 06, 08, 10, 11, and 13) have high front contrast ratios and low variations in the front contrast. In contrast, the front contrast is low in the cases of a 50°-85° average value of higher than 12% (displays 01 and 02), a retardation film not satisfying the value of Formula (II) (displays 07 and 12), and a DI value outside the range of the present invention (displays 14 to 17).

The front contrast is also low in display 05 having a maximum in-plane retardation in the horizontal direction.

Example 2

Displays were produced in combinations shown in the following table using the TN mode liquid crystal cell used in Example 1 and the same retardation film and prism sheet as those in Example 1.

The displays were evaluated as in Example 1. The results are shown in the following table. The front contrast values are shown as relative ratios to that of the display 21, a reference.

TABLE 6

|  | Retardation film | Bonding direction of polarizing plate | TN cell No | DI value of cell | Backlight unit Light-collecting sheet | Light-collecting direction | Half-value angle | 50°-85° average light quantity |
|---|---|---|---|---|---|---|---|---|
| Display 21 | 6 | O mode | P-1 | 0.000760 | None | — | 52° | 22% |
| Display 22 | 6 | O mode | P-1 | 0.000760 | A | Vertical | 34° | 15% |
| Display 23 | 6 | O mode | P-1 | 0.000760 | B | Vertical | 33° | 6.9% |
| Display 24 | 6 | O mode | P-1 | 0.000760 | C | Vertical | 38° | 1.8% |
| Display 25 | 6 | O mode | P-1 | 0.000760 | C | Horizontal | 38° | 1.8% |
| Display 26 | 2 | O mode | P-1 | 0.000760 | C | Vertical | 38° | 1.8% |
| Display 27 | 4 | O mode | P-1 | 0.000760 | C | Vertical | 38° | 1.8% |
| Display 28 | 5 | O mode | P-1 | 0.000760 | C | Vertical | 38° | 1.8% |
| Display 29 | 2 | O mode | P-2 | 0.000590 | C | Vertical | 38° | 1.8% |
| Display 30 | 4 | O mode | P-2 | 0.000590 | C | Vertical | 38° | 1.8% |
| Display 31 | 5 | O mode | P-2 | 0.000590 | C | Vertical | 38° | 1.8% |
| Display 32 | 6 | O mode | P-2 | 0.000590 | C | Vertical | 38° | 1.8% |
| Display 33 | 5 | O mode | P-3 | 0.000875 | C | Vertical | 38° | 1.8% |
| Display 34 | 6 | O mode | P-3 | 0.000875 | C | Vertical | 38° | 1.8% |

TABLE 7

| | Performance | | |
| --- | --- | --- | --- |
| | Average value of front contrast | Variation in front contrast | |
| Display 21 | D | A | Comparative Example |
| Display 22 | D | A | Comparative Example |
| Display 23 | C | B | Example |
| Display 24 | C | B | Example |
| Display 25 | D | A | Comparative Example |
| Display 26 | D | A | Comparative Example |
| Display 27 | D | A | Comparative Example |
| Display 28 | C | B | Example |
| Display 29 | D | A | Comparative Example |
| Display 30 | D | A | Comparative Example |
| Display 31 | C | B | Example |
| Display 32 | B | B | Example |
| Display 33 | D | A | Comparative Example |
| Display 34 | D | A | Comparative Example |

The results demonstrate that all of the displays of the present invention (displays 23, 24, 28, 31, and 32) have high front contrast ratios. In contrast, the front contrast is low in the cases of a 50°-85° average value of higher than 12% (displays 21 and 22), a retardation film not satisfying the value of Formula (II) (displays 26, 27, 29, and 30), and a DI value outside the range of the present invention (displays 33 and 34).

In addition, in display 25, the direction giving a maximum in-plane retardation was horizontal.

The variations in front contrast of displays 23, 24, 28, 31, and 32 of the present invention are within a level acceptable for practical use because that the P value of the retardation film used in the O mode is larger than the P value of the retardation film used in the E mode.

Example 3

Retardation films 7 and 8 were produced at variable stretching rates in the longitudinal and transverse directions of the retardation film 4. The stretching conditions are shown in the following table.

TABLE 8

| | Longitudinal stretching | | | Transverse stretching | |
| --- | --- | --- | --- | --- | --- |
| | Temp. | Stretching rate | L/W ratio | Temp. | Stretching rate |
| Retardation film 7 | 143° C. | 25% | 0.1 | 143° C. | 20% |
| Retardation film 8 | 143° C. | 30% | 0.1 | 143° C. | 20% |

The Re values, Rth values, slow axis angles, and slow axis ranges of the retardation films 7 and 8 were measured by predetermined processes, and the P values were calculated. The results are shown in the following table.

TABLE 9

| Retardation film | Re (nm) | Rth (nm) | Slow axis angle (designed value) | Slow axis range | P value | Average thickness (µm) |
| --- | --- | --- | --- | --- | --- | --- |
| 7 | 9 | 151 | 90° | 0.9° | 8.1 | 41 |
| 8 | 20 | 158 | 90° | 0.5° | 10.0 | 38 |

Forty-six displays were produced in combinations shown in the following table using the TN mode liquid crystal cell used in Example 1 and the same retardation film and prism sheet as those in Example 1.

The displays were evaluated as in Example 1. The results are shown in the following table. The front contrast values are shown as relative ratios to that of the display 41, a reference.

TABLE 10

| | Bonding | TN cell | | Backlight unit | | | |
| --- | --- | --- | --- | --- | --- | --- | --- |
| | Retardation film | direction of polarizing plate | No | DI value of cell | Prism sheet | Light-collecting direction | Half-value angle | 50°-85° average light quantity |
| Display 41 | 4 | E mode | P-1 | 0.000760 | None | — | 52° | 22% |
| Display 42 | 4 | E mode | P-1 | 0.000760 | C | Vertical | 38° | 1.8% |
| Display 43 | 7 | E mode | P-1 | 0.000760 | C | Vertical | 38° | 1.8% |
| Display 44 | 8 | E mode | P-1 | 0.000760 | C | Vertical | 38° | 1.8% |
| Display 45 | 4 | E mode | P-2 | 0.000590 | C | Vertical | 38° | 1.8% |
| Display 46 | 7 | E mode | P-2 | 0.000590 | C | Vertical | 38° | 1.8% |
| Display 47 | 8 | E mode | P-2 | 0.000590 | C | Vertical | 38° | 1.8% |

TABLE 11

| | Performance | | |
| --- | --- | --- | --- |
| | Average value of front contrast | Variation in front contrast | |
| Display 41 | D | A | Comparative Example |
| Display 42 | C | A | Example |
| Display 43 | B | A | Example |
| Display 44 | C | A | Example |
| Display 45 | B | A | Example |
| Display 46 | A | A | Example |
| Display 47 | B | A | Example |

The results demonstrate that all of the displays of the present invention (displays 42 to 47) have high front contrast ratios and low variations in the front contrast. The front constant is higher in the case of using the retardation film 7 having a slow axis orthogonal to the transmission axis of the polarizing film, compared to the case of using the retardation film 4 having a slow axis parallel to the transmission axis of the polarizing film (comparisons between displays 42 and 43 and between displays 45 and 46). In the case of using the retardation film 8, the performance is also the same as that in the case of using the retardation film 4 (comparisons between displays 42 and 44 and between displays 45 and 47).

EXPLANATION OF THE LETTERING

10 TN mode liquid crystal cell
10a rubbing direction of the substrate on the viewing side 10b rubbing direction of the substrate on the backlight side
12 viewing-side polarizing film
12a transmission axis direction of viewing-side polarizing film
14 backlight-side polarizing film
14a transmission axis direction of backlight-side polarizing film
16 viewing-side retardation film
16a slow axis average direction of viewing-side retardation film
18 backlight-side retardation film
18a slow axis average direction of backlight-side retardation film
20, 22 protective film
1 prism sheet
2 support
3 first surface
4 second surface
5 protrudent portion (prism unit)
6 light-impermeable portion
7 sidelobe preventing portion
8 positive photoresist layer
9 white reflection layer
40 white reflection sheet
41 prism sheet
42 light source
43 diffuser plate
44 diffuser sheet

What is claimed is:

1. A liquid crystal display device comprising:
a first polarizing film and a second polarizing film;
a twisted alignment mode liquid crystal cell disposed between the first polarizing film and the second polarizing film;
a first retardation film disposed between the first polarizing film and the liquid crystal cell;
a second retardation film disposed between the second polarizing film and the liquid crystal cell; and
a backlight unit with a light-collecting prism sheet which is disposed on the back side of the liquid crystal cell,
wherein the absorption axis of the first polarizing film is orthogonal to the absorption axis of the second polarizing film;
the liquid crystal cell includes a first substrate disposed nearer to the first polarizing film and a second substrate disposed nearer to the second polarizing film;
at least one of the first substrate and the second substrate includes a transparent electrode;
the transmission axis of the first polarizing film is parallel to the rubbing direction of the first substrate;
the transmission axis of the second polarizing film is parallel to the rubbing direction of the second substrate;
the first retardation film and the second retardation film each have an in-plane retardation Re(550) at a wavelength of 550 nm and a retardation Rth(550) across the thickness at a wavelength of 550 nm satisfying Formulae (I) and (II):

$$1 \text{ nm} \leq Re(550) \leq 50 \text{ nm} \quad \text{(I)}$$

$$120 \text{ nm} \leq Rth(550) \leq 220 \text{ nm} \quad \text{(II)};$$

the liquid crystal cell has a depolarizing index (DI value) of 0.000800 or less; and
the backlight unit emits backlight such that averaged light quantity in the emission angle range of 50° to 85° inclined from a normal line of a display screen of the liquid crystal display device toward a direction giving a maximum in-plane retardation is 12% or less of the light quantity in the normal line direction; and
the DI value is calculated by the following formula;

$$DI = 2/(1+T\text{max}/T\text{min})$$

wherein Tmax represents a value of brightness in display mode of a black picture of the liquid crystal cell when the upper and lower polarizing plates are disposed in a parallel Nicol state and when the highest brightness is given by fine adjustment of the angle defined by the polarizing plates; and
Tmin represents a value of brightness in a display mode of a black picture of the liquid crystal cell when the upper and lower polarizing plates are disposed in a cross Nicol state and when the lowest brightness is given by fine adjustment of the angle defined by the polarizing plates.

2. A liquid crystal display device comprising:
a first polarizing film and a second polarizing film;
a twisted alignment mode liquid crystal cell disposed between the first polarizing film and the second polarizing film;
a first retardation film disposed between the first polarizing film and the liquid crystal cell;
a second retardation film disposed between the second polarizing film and the liquid crystal cell; and
a backlight unit with a light-collecting prism sheet which is disposed on the back side of the liquid crystal cell, wherein
the absorption axis of the first polarizing film is orthogonal to the absorption axis of the second polarizing film;
the liquid crystal cell includes a first substrate disposed nearer to the first polarizing film and a second substrate disposed nearer to the second polarizing film;
at least one of the first substrate and the second substrate includes a transparent electrode;
the transmission axis of the first polarizing film is orthogonal to the rubbing direction of the first substrate;
the transmission axis of the second polarizing film is orthogoal to the rubbing direction of the second substrate;
the first retardation film and the second retardation film each have an in-plane retardation Re(550) at a wavelength of 550 nm and a retardation Rth(550) across the thickness at a wavelength of 550 nm satisfying Formulae (III) and (IV):

$$60 \text{ nm} \leq Re(550) \leq 120 \text{ nm} \quad \text{(III)}$$

$$120 \text{ nm} \leq Rth(550) \leq 220 \text{ nm} \quad \text{(IV)};$$

the liquid crystal cell has a depolarizing index (DI value) of 0.000800 or less; and
the backlight unit emits backlight such that the averaged light quantity in the emission angle range of 50° to 85° inclined from the normal line of the display screen of the liquid crystal display device toward the direction giving a maximum in-plane retardation is 12% or less of the light quantity in the normal line direction; and
the DI value is calculated by the following formula;

$$DI = 2/(1+T\text{max}/T\text{min})$$

wherein Tmax represents a value of brightness in display mode of a black picture of the liquid crystal cell when the upper and lower polarizing plates are disposed in a parallel Nicol state and when the highest brightness is given by fine adjustment of the angle defined by the polarizing plates; and Tmin represents a value of brightness in a display mode of a black picture of the liquid crystal cell when the upper and lower polarizing plates are disposed in a cross Nicol state and when the lowest brightness is given by fine adjustment of the angle defined by the polarizing plates.

3. The liquid crystal display device according to claim 1, wherein a P value being the product of a slow axis range of the retardation film and a Re(550) value is 10 or less, the P value being represented by the following Formula:

$$P = \text{slow axis range} \times Re(550)$$

wherein the slow axis range is a difference between a maximum and a minimum of the in-plane slow axis azimuth (unit: °) of the retardation film, and Re(550) is represented by using "nm" as a unit.

4. The liquid crystal display device according to claim 1, wherein the backlight unit emits backlight with a luminous intensity having a half-value angle of 35° or more.

5. The liquid crystal display device according to claim 1, wherein a direction giving a maximum in-plane retardation of the liquid crystal cell is a vertical direction when the display screen is viewed.

6. The liquid crystal display device according to claim 1, wherein the prism sheet is disposed such that a protrudent portion of the sheet faces the liquid crystal cell.

7. The liquid crystal display device according to claim 6, wherein the prism sheet includes prisms having isosceles triangular cross-sections having a vertical angle of 95° to 130°.

8. The liquid crystal display device according to claim 1, wherein the first and second retardation films each have a slow axis range of 2.0° or less, the slow axis range being a difference between a maximum and a minimum of the in-plane slow axis azimuth (unit: °).

9. The liquid crystal display device according to claim 2, wherein a P value being the product of a slow axis range of the retardation film and a Re(550) value is 10 or less, the P value being represented by the following Formula:

$$P = \text{slow axis range} \times Re(550)$$

wherein the slow axis range is a difference between a maximum and a minimum of the in-plane slow axis azimuth (unit: °) of the retardation film, and Re(550) is represented by using "nm" as a unit.

10. The liquid crystal display device according to claim 2, wherein the backlight unit emits backlight with a luminous intensity having a half-value angle of 35° or more.

11. The liquid crystal display device according to claim 2, wherein a direction giving a maximum in-plane retardation of the liquid crystal cell is a vertical direction when the display screen is viewed.

12. The liquid crystal display device according to claim 2, wherein the prism sheet is disposed such that a protrudent portion of the sheet faces the liquid crystal cell.

13. The liquid crystal display device according to claim 3, wherein the backlight unit emits backlight with a luminous intensity having a half-value angle of 35° or more.

14. The liquid crystal display device according to claim 3, wherein a direction giving a maximum in-plane retardation of the liquid crystal cell is a vertical direction when the display screen is viewed.

15. The liquid crystal display device according to claim 3, wherein the prism sheet is disposed such that a protrudent portion of the sheet faces the liquid crystal cell.

16. The liquid crystal display device according to claim 3, wherein the first and second retardation films each have a slow axis range of 2.0° or less, the slow axis range being a difference between a maximum and a minimum of the in-plane slow axis azimuth (unit: °).

17. The liquid crystal display device according to claim 4, wherein a direction giving a maximum in-plane retardation of the liquid crystal cell is a vertical direction when the display screen is viewed.

18. The liquid crystal display device according to claim 4, wherein the prism sheet is disposed such that a protrudent portion of the sheet faces the liquid crystal cell.

19. The liquid crystal display device according to claim 5, wherein the prism sheet is disposed such that a protrudent portion of the sheet faces the liquid crystal cell.

* * * * *